(12) United States Patent
Machida

(10) Patent No.: US 11,194,139 B2
(45) Date of Patent: Dec. 7, 2021

(54) VARIABLE MAGNIFICATION OPTICAL SYSTEM, OPTICAL EQUIPMENT, IMAGING EQUIPMENT AND METHOD FOR MANUFACTURING VARIABLE MAGNIFICATION OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 118 days.

(21) Appl. No.: 16/338,716

(22) PCT Filed: Oct. 24, 2017

(86) PCT No.: PCT/JP2017/038279
§ 371 (c)(1),
(2) Date: Apr. 2, 2019

(87) PCT Pub. No.: WO2018/079519
PCT Pub. Date: May 3, 2018

(65) Prior Publication Data
US 2020/0116984 A1    Apr. 16, 2020

(30) Foreign Application Priority Data

Oct. 26, 2016  (JP) .............................. JP2016-209624

(51) Int. Cl.
*G02B 15/14*    (2006.01)
*G02B 15/20*    (2006.01)
*G02B 27/64*    (2006.01)

(52) U.S. Cl.
CPC ..... *G02B 15/144105* (2019.08); *G02B 15/20* (2013.01); *G02B 27/646* (2013.01)

(58) Field of Classification Search
CPC .......... G02B 15/173; G02B 15/145121; G02B 15/155; G02B 13/009; G02B 7/282;
(Continued)

(56) References Cited

U.S. PATENT DOCUMENTS 5,835,282 A    11/1998  Suenaga et al.
6,031,669 A     2/2000  Ohtake
(Continued)

FOREIGN PATENT DOCUMENTS

CN    101369048 A    2/2009
JP    H01-314219 A   12/1989
(Continued)

OTHER PUBLICATIONS

International Search Report from International Patent Application No. PCT/JP2017/038279, dated Jan. 23, 2018.
(Continued)

*Primary Examiner* — Mustak Choudhury
(74) *Attorney, Agent, or Firm* — SGPatents PLLC

(57) ABSTRACT

A variable magnification optical system comprises, in order from an object side, a first lens group G1 having positive refractive power, a second lens group G2 having negative refractive power, a third lens group G3 having positive refractive power and a fourth lens group G4 having negative refractive power; upon varying a magnification, a distance between the first lens group G1 and the second lens group G2 being varied, a distance between the second lens group G2 and the third lens group G3 being varied, and a distance between the third lens group G3 and the fourth lens group G4 being varied; upon focusing, the fourth lens group G4 being moved; and a predetermined conditional expression being satisfied. With such a configuration, there is provided a variable magnification optical system whose focusing lens group is compact in size and reduced in weight, so high speed and quiet focusing can be effected without lens barrel being made large in size, and further by which variations in aberrations upon varying magnification from the wide angle end state to the telephoto end state as well as variations in
(Continued)

aberrations upon focusing from the infinite distance object to the close distance object can be superbly suppressed.

18 Claims, 18 Drawing Sheets

(58) Field of Classification Search
CPC .. G02B 13/12; G02B 17/0896; G02B 21/025; G02B 17/0694; G02B 27/646; G02B 15/144105; G02B 15/144113; G02B 15/144511; G02B 15/20; G02B 15/14; G02B 15/22; G02B 15/1461; G02B 15/16; G02B 15/177; G02B 13/18; G02B 27/0018; G02B 27/0025; G02B 9/34
See application file for complete search history.

(56) References Cited

U.S. PATENT DOCUMENTS

| | | | |
|---|---|---|---|
| 9,507,169 B2 * | 11/2016 | Obikane | G02B 15/145105 |
| 2005/0275949 A1 | 12/2005 | Fujimoto et al. | |
| 2009/0046366 A1 | 2/2009 | Take | |
| 2011/0205636 A1 * | 8/2011 | Ito | G02B 15/145121 |
| | | | 359/684 |
| 2011/0228158 A1 | 9/2011 | Imaoka et al. | |
| 2011/0267708 A1 | 11/2011 | Kon | |
| 2012/0019931 A1 | 1/2012 | Ogata et al. | |
| 2012/0050603 A1 | 3/2012 | Imaoka et al. | |
| 2012/0092777 A1 | 4/2012 | Tochigi et al. | |
| 2012/0293872 A1 | 11/2012 | Katayose et al. | |
| 2013/0229565 A1 | 9/2013 | Hatakeyama | |
| 2013/0242142 A1 | 9/2013 | Matsumura | |
| 2014/0132830 A1 | 5/2014 | Izuhara et al. | |
| 2015/0168697 A1 | 6/2015 | Ogata | |
| 2015/0350557 A1 | 12/2015 | Tanaka | |

FOREIGN PATENT DOCUMENTS

| | | |
|---|---|---|
| JP | H04-293007 A | 10/1992 |
| JP | H05-224124 A | 9/1993 |
| JP | H08-122640 A | 5/1996 |
| JP | H09-325274 A | 12/1997 |
| JP | 2005352057 A | 2/2005 |
| JP | 2010-197860 A | 9/2010 |
| JP | 2011-197470 A | 10/2011 |
| JP | 2011-209347 A | 10/2011 |
| JP | 2011-232624 A | 11/2011 |
| JP | 2012-027261 A | 2/2012 |
| JP | 2012-047814 A | 3/2012 |
| JP | 2012-083602 A | 4/2012 |
| JP | 2012-242617 A | 12/2012 |
| JP | 2013-007898 A | 1/2013 |
| JP | 2013-117667 A | 6/2013 |
| JP | 2013-182259 A | 9/2013 |
| JP | 2013-218291 A | 10/2013 |
| JP | 2014-228810 A | 12/2014 |
| JP | 2015-118127 A | 6/2015 |
| JP | 2015-227979 A | 12/2015 |
| WO | WO 2013/027364 A1 | 2/2013 |

OTHER PUBLICATIONS

Office Action dated Apr. 7, 2020 in Japanese Patent Application No. 2018-547672.
Office Action dated Sep. 29, 2020, in Chinese Patent Application No. 201780065786.7.
Office Action dated Apr. 28, 2021, in Chinese Patent Application No. 201780065786.7.
Office Action dated Aug. 4, 2021, in Chinese Patent Application No. 201780065786.7.
Office Action dated Oct. 19, 2021, in Japanese Patent Application No. 2020-206736.

* cited by examiner

COMA

COMA

VARIABLE MAGNIFICATION OPTICAL SYSTEM, OPTICAL EQUIPMENT, IMAGING EQUIPMENT AND METHOD FOR MANUFACTURING VARIABLE MAGNIFICATION OPTICAL SYSTEM

TECHNICAL FIELD

The present invention relates to a variable magnification optical system, an optical equipment, an imaging equipment, and a method for manufacturing the variable magnification optical system.

BACKGROUND ART

Conventionally, there have been proposed a variable magnification optical system which is suitable for a photographing camera, an electronic still camera, a video camera or the like. See, for example, Japanese patent application Laid-Open Gazette No. H4-293007. However, with respect to conventional variable magnification optical system, weight reducing has not been taken in consideration sufficiently.

PRIOR ART REFERENCE

Patent Document

Patent Document 1: Japanese patent application Laid-Open Gazette No. H4-293007

SUMMARY OF THE INVENTION

According to a first aspect of the present invention, there is provided a variable magnification optical system comprising, in order from an object side: a first lens group having positive refractive power, a second lens group having negative refractive power, a third lens group having positive refractive power, and a fourth lens group having negative refractive power; and upon varying a magnification, a distance between the first lens group and the second lens group being varied, a distance between the second lens group and the third lens group being varied, and a distance between the third lens group and the fourth lens group being varied;

upon focusing, the fourth lens group being moved; and the following conditional expressions being satisfied:

$$0.55 < f2/f4 < 1.40$$

$$1.40 < f1/fw < 2.80$$

where f1 denotes a focal length of the first lens group; f2 denotes a focal length of the second lens group; f4 denotes a focal length of the fourth lens group; and fw denotes a focal length of the variable magnification optical system in the wide angle end state.

According to a second aspect of the present invention, there is provided a method for manufacturing a variable magnification optical system, the method comprising step of arranging, in order from an object side: a first lens group having positive refractive power, a second lens group having negative refractive power, a third lens group having positive refractive power, and a fourth lens group having negative refractive power, such that, upon varying a magnification, a distance between the first lens group and the second lens group being varied, a distance between the second lens group and the third lens group and the third lens group being varied, and a distance between the third lens group and the fourth lens group being varied;

upon focusing, the fourth lens group being moved; and the following conditional expressions being satisfied:

$$0.55 < f2/f4 < 1.40$$

$$1.40 < f1/fw < 2.80$$

where f1 denotes a focal length of the first lens group; f2 denotes a focal length of the second lens group; f4 denotes a focal length of the fourth lens group; and fw denotes a focal length of the variable magnification optical system in the wide angle end state.

EMBODIMENT FOR CARRYING OUT THE INVENTION

Figure 1:
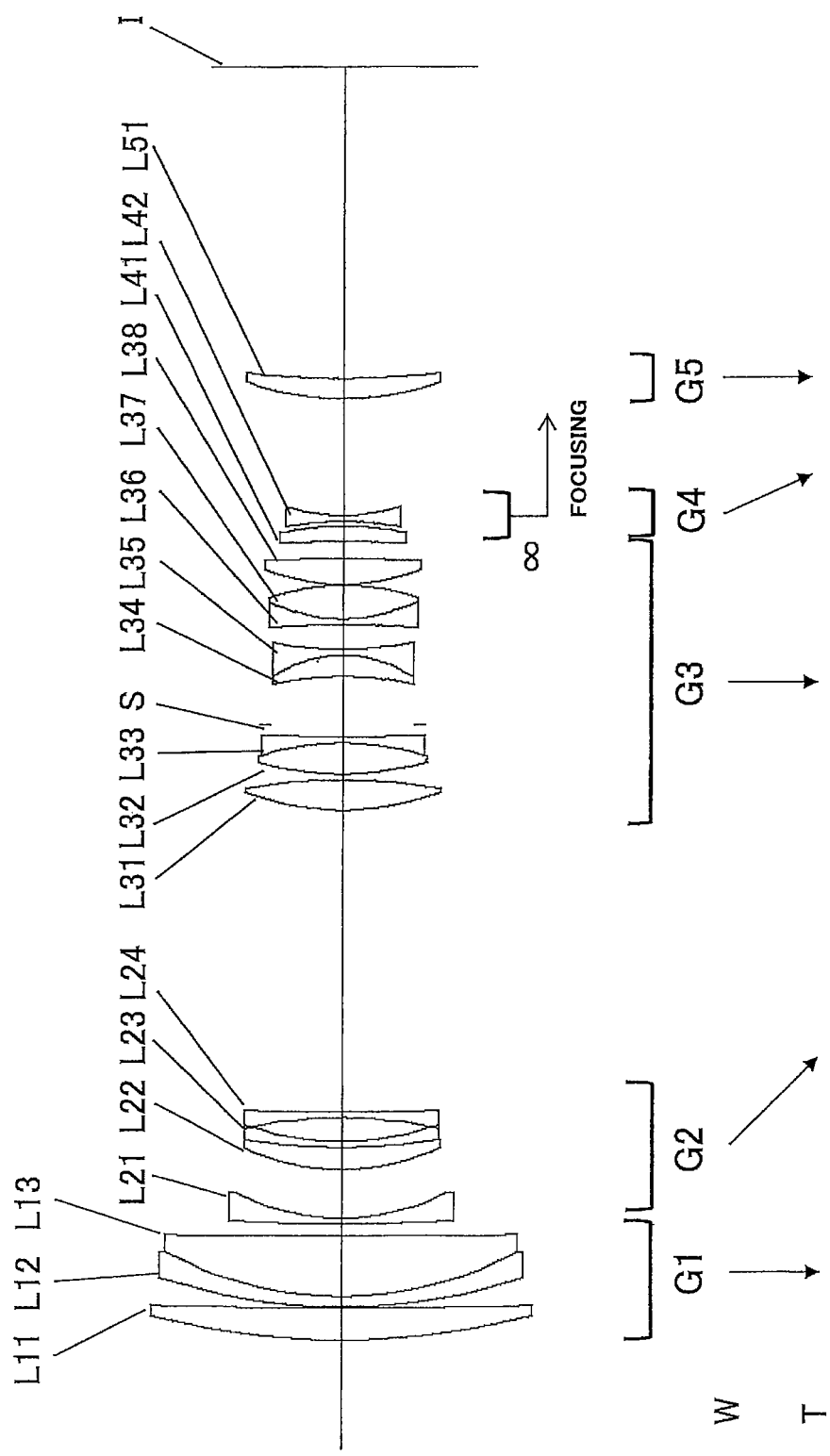
FIG. 1 is a sectional view showing a variable magnification optical system according to a First Example.

A variable magnification optical system, an optical equipment, an imaging equipment and a method for manufacturing the variable magnification optical system according to the embodiment of the present invention is described below.

The variable magnification optical system according to the present embodiment comprises, in order from an object side, a first lens group having positive refractive power, a second lens group having negative refractive power, a third lens group having positive refractive power, and a fourth lens group having negative refractive power;

upon varying a magnification, a distance between the first lens group and the second lens group being varied, a distance between the second lens group and the third lens group being varied, and a distance between the third lens group and the fourth lens group being varied;

upon focusing from an infinite distance object to a close distance object, the fourth lens group being moved; and the following conditional expressions (1) and (2) being satisfied:

$$0.55 < f2/f4 < 1.40 \quad (1)$$

$$1.40 < f1/fw < 2.80 \quad (2)$$

where f1 denotes a focal length of the first lens group; f2 denotes a focal length of the second lens group; f4 denotes a focal length of the fourth lens group; and fw denotes a focal length of the variable magnification optical system in the wide angle end state.

The variable magnification optical system according to the present embodiment comprises at least four lens groups, as described above, and can correct superbly aberrations upon varying magnification by varying respective distances between the lens groups upon varying magnification.

Further, in the variable magnification optical system according to the present Embodiment, as described above, the fourth lens group is made to be a focusing lens group, thereby the focusing lens group being made compact in size and reduced in weight.

The conditional expression (1) defines a ratio of the focal length of the second lens group to the focal length of the fourth lens group. With satisfying the conditional expression (1), the variable magnification optical system according to the present embodiment can suppress variations in spherical aberration and other various aberrations upon varying magnification from the wide angle end state to the telephoto end state. Further, upon focusing from an infinite distance object to a close distance object, variations in spherical aberration and other various aberrations can be suppressed.

When the value of f2/f4 of the variable magnification optical system according to the present embodiment is equal to or exceeds the upper limit value of the conditional expression (1), the refractive power of the fourth lens group becomes large, and as a result, it becomes difficult to suppress variations in spherical aberration and other various aberrations upon focusing from an infinite distance object to a close distance object. Meanwhile, in order to attain the advantageous effect of the present embodiment surely, it is preferable to set the upper limit value of the conditional expression (1) to 1.35. Also, in order to attain the advantageous effect of the present embodiment more surely, it is preferable to set the upper limit value of the conditional expression (1) to 1.30.

On the other hand, when the value of f2/f4 of the variable magnification optical system according to the present embodiment is equal to or falls below the lower limit value of the conditional expression (1), the refractive power of the second lens group becomes large, and it becomes difficult to suppress variations in spherical aberration and other various aberrations upon varying magnification from the wide angle end state to the telephoto end state. Meanwhile, in order to attain the advantageous effect of the present embodiment surely, it is preferable to set the lower limit value of the conditional expression (1) to 0.58. Also, in order to attain the advantageous effect of the present embodiment more surely, it is preferable to set the lower limit value of the conditional expression (1) to 0.60.

The conditional expression (2) defines a ratio of the focal length of the first lens group to the focal length of the variable magnification optical system in the wide angle end state. With satisfying the conditional expression (2), a lens barrel of the variable magnification optical system according to the present embodiment can be prevented from being large in size and it becomes possible to suppress variations in spherical aberration and other various aberrations upon varying magnification from the wide angle end state to the telephoto end state.

When the value of f1/fw of the variable magnification optical system according to the present embodiment is equal to or exceeds the upper limit value of the conditional expression (2), the refractive power of the first lens group becomes small, and as a result, the lens barrel becomes large in size. Meanwhile, in order to attain the advantageous effect of the present embodiment surely, it is preferable to set the upper limit value of the conditional expression (2) to 2.70. Also, in order to attain the advantageous effect of the present embodiment more surely, it is preferable to set the upper limit value of the conditional expression (2) to 2.60.

On the other hand, when the value of f1/fw is equal to or falls below the lower limit value of the conditional expression (2), the refractive power of the first lens group becomes large, and as a result, it becomes difficult to correct spherical aberration and other various aberrations upon varying magnification from the wide angle end state to the telephoto end state. Meanwhile, in order to attain the advantageous effect of the present embodiment surely, it is preferable to set the lower limit value of the conditional expression (2) to 1.50. Also, in order to attain the advantageous effect of the present embodiment more surely, it is preferable to set the lower limit value of the conditional expression (2) to 1.60.

With such construction as described, it is possible to realize a variable magnification optical system whose focusing lens group is compact in size and reduced in weight, so high speed and quiet focusing can be effected without lens barrel being made large in size, and further by which variations in aberrations upon varying magnification from the wide angle end state to the telephoto end state as well as variations in aberrations upon focusing from the infinite distance object to the close distance object can be superbly suppressed.

Further, it is desirable that the variable magnification optical system according to the present embodiment satisfies the following conditional expression (3):

$$0.82 < (-f2)/f3 < 1.30 \quad (3)$$

where f3 denotes a focal length of the third lens group.

The conditional expression (3) defines a ratio of the focal length of the second lens group to the focal length of the third lens group. With satisfying the conditional expression (3), the variable magnification optical system according to the present embodiment can suppress variations in spherical aberration and other various aberrations upon varying magnification from the wide angle end state to the telephoto end state.

When the value of (−f2)/f3 of the variable magnification optical system according to the present embodiment is equal to or exceeds the upper limit value in the conditional expression (3), the refractive power of the third lens group becomes large, and as a result, it becomes difficult to suppress variations in spherical aberration and other various aberrations upon varying magnification from the wide angle end state to the telephoto end state. Meanwhile, in order to attain the advantageous effect of the present embodiment surely, it is preferable to set the upper limit value of the conditional expression (3) to 1.25. Also, in order to attain the advantageous effect of the present embodiment more surely, it is preferable to set the upper limit value of the conditional expression (3) to 1.20.

On the other hand, when the value of (−f2)/f3 of the variable magnification optical system according to the present embodiment is equal to or falls below the lower limit of the conditional expression (3), the refractive power of the second lens group becomes large, and it becomes difficult to suppress variations in spherical aberration and other various aberrations upon varying magnification from the wide angle end state to the telephoto end state. Meanwhile, in order to attain the advantageous effect of the present embodiment surely, it is preferable to set the lower limit value of the conditional expression (3) to 0.85. Also, in order to attain the advantageous effect of the present embodiment more surely, it is preferable to set the lower limit value of the conditional expression (3) to 0.90.

Further, it is desirable that the variable magnification optical system according to the present embodiment satisfies the following conditional expression (4):

$$2.00 < f1/(-f2) < 4.00 \qquad (4)$$

The conditional expression (4) defines a ratio of the focal length of the first lens group to the focal length of the second lens group. With satisfying the conditional expression (4), the variable magnification optical system according to the present embodiment can suppress variations in spherical aberration and other various aberrations upon varying magnification from the wide angle end state to the telephoto end state.

When the value of f1/(−f2) of the variable magnification optical system according to the present embodiment is equal to or exceeds the upper limit value in the conditional expression (4), the refractive power of the second lens group becomes large, and as a result, it becomes difficult to suppress variations in spherical aberration and other various aberrations upon varying magnification from the wide angle end state to the telephoto end state. Meanwhile, in order to attain the advantageous effect of the present embodiment surely, it is preferable to set the upper limit value of the conditional expression (4) to 3.80. Also, in order to attain the advantageous effect of the present embodiment more surely, it is preferable to set the upper limit value of the conditional expression (4) to 3.50.

On the other hand, when the value of f1/(−f2) of the variable magnification optical system according to the present embodiment is equal to or falls below the lower limit value in the conditional expression (4), the refractive power of the first lens group becomes large, and it becomes difficult to suppress variations in spherical aberration and other various aberrations upon varying magnification from the wide angle end state to the telephoto end state. Meanwhile, in order to attain the advantageous effect of the present embodiment surely, it is preferable to set the lower limit value of the conditional expression (4) to 2.30. Also, in order to attain the advantageous effect of the present embodiment more surely, it is preferable to set the lower limit value of the conditional expression (4) to 2.60.

It is desirable that in the variable magnification optical system the fourth lens group consists of, in order from the object side, a positive lens and a negative lens. With such a configuration, the fourth lens group that is a focusing lens group can be reduced in weight and spherical aberration and other various aberrations upon varying magnification from the wide angle end state to the telephoto end state, can be suppressed.

Further, it is desirable that the variable magnification optical system according to the present embodiment satisfies the following conditional expression (5):

$$2.20 < fP/(-fN) < 3.70 \qquad (5)$$

where fP denotes a focal length of the positive lens in the fourth lens group, and fN denotes a focal length of the negative lens in the fourth lens group.

The conditional expression (5) defines a ratio of the focal length of the positive lens in the fourth lens group to the focal length of the negative lens in the fourth lens group. With satisfying the conditional expression (5), the variable magnification optical system according to the present embodiment can suppress variations in coma aberration and other various aberrations upon focusing from the infinite distance object to the close distance object.

When the value of fP/(−fN) of the variable magnification optical system according to the present embodiment is equal to or exceeds the upper limit value of the conditional expression (5), the refractive power of the negative lens in the fourth lens group becomes large, and coma aberration becomes excessively generated. As a result, it becomes difficult to suppress variations in coma aberration and other various aberrations upon focusing from the infinite distance object to the close distance object. Meanwhile, in order to attain the advantageous effect of the present embodiment surely, it is preferable to set the upper limit value of the conditional expression (5) to 3.60. Also, in order to attain the advantageous effect of the present embodiment more surely, it is preferable to set the upper limit value of the conditional expression (5) to 3.50.

On the other hand, when the value of fP/(−fN) of the variable magnification optical system according to the present embodiment is equal to or falls below the lower limit value of the conditional expression (5), the refractive power of the positive lens in the fourth lens group becomes large, and as a result, coma aberration is excessively corrected. Therefore, it becomes difficult to suppress variations in coma aberration and other various aberrations upon focusing from the infinite distance object to the close distance object. Meanwhile, in order to attain the advantageous effect of the present embodiment surely, it is preferable to set the lower limit value of the conditional expression (5) to 2.30. Also, in order to attain the advantageous effect of the present embodiment more surely, it is preferable to set the lower limit value of the conditional expression (5) to 2.40.

Further, in the variable magnification optical system according to the present embodiment it is desirable that, upon varying magnification, the first lens group is fixed in position with respect to the image plane. With this configuration, it is possible for the variable magnification optical system according to the present embodiment to carry out varying magnification from the wide angle end state to the telephoto end state without changing the total length thereof.

Further, in the variable magnification optical system according to the present embodiment it is desirable that, upon varying magnification, the third lens group is fixed in position with respect to the image plane. With this configuration, it is possible to suppress deterioration in performance of the variable magnification optical system according to the present embodiment caused due to manufacturing error, thereby it becoming possible to secure mass-productivity.

Further, in the variable magnification optical system according to the present embodiment it is desirable that the first lens group comprises, in order from the object side, a positive lens, a negative lens and a positive lens. With this configuration, it is possible to correct effectively spherical aberration and coma aberration in the telephoto end state.

Further, it is desirable that the variable magnification optical system according to the present embodiment comprises a vibration reduction lens group that is movable to have a displacement component in the direction perpendicular to the optical axis. With this configuration, it is possible to correct displacement of the imaging position caused by a camera shake, that is, it is possible to carry out vibration reduction.

Further, it is desirable that the variable magnification optical system according to the present embodiment satisfies the following conditional expression (6):

$$0.70 < |fvr|/f3 < 1.60 \quad (6)$$

where fvr denotes a focal length of the vibration reduction lens group; and f3 denotes a focal length of the third lens group.

The conditional expression (6) defines a ratio of the focal length of the vibration reduction lens group to the focal length of the third lens group. With satisfying the conditional expression (6), the variable magnification optical system according to the present embodiment can suppress effectively deterioration in performance upon the vibration reduction being conducted and also can suppress variations in spherical aberration and other various aberrations.

When the value of |fvr|/f3 of the variable magnification optical system according to the present embodiment is equal to or exceeds the upper limit value in the conditional expression (6), the refractive power of the third lens group becomes large, and as a result, it becomes difficult to suppress variations in spherical aberration and other various aberrations upon varying magnification from the wide angle end state to the telephoto end state. Meanwhile, in order to attain the advantageous effect of the present embodiment surely, it is preferable to set the upper limit value of the conditional expression (6) to 1.50. Also, in order to attain the advantageous effect of the present embodiment more surely, it is preferable to set the upper limit value of the conditional expression (6) to 1.40.

On the other hand, when the value of |fvr|/f3 of the variable magnification optical system according to the present embodiment is equal to or falls below the lower limit value in the conditional expression (6), the refractive power of the vibration reduction lens group becomes large, and it becomes difficult to correct decentering coma generated upon conducting the vibration reduction. Meanwhile, in order to attain the advantageous effect of the present embodiment surely, it is preferable to set the lower limit value of the conditional expression (6) to 0.80. Also, in order to attain the advantageous effect of the present embodiment more surely, it is preferable to set the lower limit value of the conditional expression (6) to 0.90.

The optical equipment according to the present embodiment of the present invention comprises the variable magnification optical system having a configuration as described above.

The imaging equipment according to the present embodiment of the present invention comprises the variable magnification optical system having the configuration as described above and an imaging section picking up an image formed through the variable magnification optical system.

With such configurations, it is possible to realize an optical equipment and an imaging equipment, in which focusing lens group is compact in size and reduced in weight, so high speed and quiet focusing being effected without lens barrel being made large in size, and further by which variations in aberrations upon varying magnification from the wide angle end state to the telephoto end state as well as variations in aberrations upon focusing from the infinite distance object to the close distance object can be superbly suppressed.

A method for manufacturing a variable magnification optical system according to the present embodiment of the present invention, comprises step of arranging, in order from an object side: a first lens group having positive refractive power, a second lens group having negative refractive power, a third lens group having positive refractive power, and a fourth lens group having negative refractive power, such that, upon varying a magnification, a distance between the first lens group and the second lens group being varied, a distance between the second lens group and the third lens group being varied, and a distance between the third lens group and the fourth lens group being varied, upon focusing from an infinite distance object to a close distance object, the fourth lens group being moved; and the following conditional expressions (1) and (2) being satisfied:

$$0.55 < f2/f4 < 1.40 \quad (1)$$

$$1.40 < f1/fw < 2.80 \quad (2)$$

where f1 denotes a focal length of the first lens group; f2 denotes a focal length of the second lens group; f4 denotes a focal length of the fourth lens group; and fw denotes a focal length of the variable magnification optical system in the wide angle end state.

Thus, it is possible to manufacture a variable magnification optical system whose focusing lens group is compact in size and reduced in weight, thereby high speed and quiet focusing being effected without lens barrel being made large in size, and further by which variations in aberrations upon varying magnification from the wide angle end state to the telephoto end state as well as variations in aberrations upon focusing from the infinite distance object to the close distance object can be superbly suppressed.

Hereinafter, Examples of the variable magnification optical system according to the embodiment of the present application will be described with reference to the accompanying drawings.

First Example

FIG. 1 is a sectional view, showing the variable magnification optical system according to the First Example. Meanwhile, arrows in FIG. 1 and in FIG. 5, FIG. 9 and FIG. 13 described later show movement trajectories of the respective lens groups upon varying magnification from the wide angle end state (W) to the telephoto end state (T).

The variable magnification optical system according to the First Example is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 consists of, in order from the object side, a positive meniscus lens L11 having a convex surface facing the object side, and a cemented positive lens constructed by a negative meniscus lens L12 having a convex surface facing the object side cemented with a positive meniscus lens L13 having a convex surface facing the object side.

The second lens group G2 consists of, in order from the object side, a negative meniscus lens L21 having a convex surface facing the object side, a cemented positive lens constructed by a positive meniscus lens L22 having a convex surface facing the object side cemented with a negative meniscus lens L23 having a convex surface facing the object side, and a double concave negative lens L24.

The third lens group G3 consists of, in order from the object side, a double convex positive lens L31, a cemented negative lens constructed by a double convex positive lens L32 cemented with double concave negative lens L33, an aperture stop S, a cemented negative lens constructed by a positive meniscus lens L34 having a concave surface facing the object side cemented with a double concave negative lens L35, and a cemented positive lens constructed by a double concave negative lens L36 cemented with a double convex positive lens L37, and a double convex positive lens L38.

The fourth lens group G4 consists of, in order from the object side, a positive meniscus lens L41 having a concave surface facing the object side and a double concave negative lens L42.

The fifth lens group G5 consists of a positive meniscus lens L51 having a convex surface facing the object side.

In the variable magnification optical system according to the First Example, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied. At that time, the first lens group G1, the third lens group G3 and the fifth lens group G5 are fixed in positions with respect to the image plane I.

In the variable magnification optical system according to the First Example, focusing from the infinite distance object to the close distance object is carried out by moving the fourth lens group G4 as a focusing lens group toward the image side along the optical axis.

Also in the variable magnification optical system according to the First Example, the cemented negative lens constructed by the positive meniscus lens L34 and the negative lens L35, is moved as a vibration reduction lens to have a displacement component in a direction perpendicular to the optical axis, thereby carrying out vibration reduction.

Here, in a lens system in which an entire lens system has a focal length of f, and a vibration reduction coefficient, which is a ratio of a moving amount of an image on the image plane I to that of the vibration reduction lens group perpendicularly to the optical axis upon conducting vibration reduction, is K, in order to correct rotational camera shake of an angle θ, the vibration reduction lens group for correcting the camera shake may be moved by the amount of (f·tan θ)/K in a direction perpendicular to the optical axis.

In the wide-angle end state in the First Example, the vibration reduction coefficient is 1.63, and the focal length is 72.10 (mm), so that the moving amount of the vibration reduction lens group for correcting a rotational camera shake of 0.30 degrees is 0.23 (mm). In the telephoto end state, the vibration reduction coefficient is 1.70, and the focal length is 194.00 (mm), so that the moving amount of the vibration reduction lens group for correcting a rotational camera shake of 0.20 degrees is 0.40 (mm).

Table 1

Table 1 below shows various values associated with the variable magnification optical system according to the First Example.

In Table 1, f denotes a focal length, and BF denotes a back focal length (that is, a distance between a most image side lens surface and the image plane I).

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and vd denotes an Abbe number for d-line (wavelength λ=587.6 nm). Further, OP denotes an object surface, variable denotes a variable surface to surface distance, Stop S denotes an aperture stop S, and I denotes the image plane. Meanwhile, a radius of curvature r=∞ denotes a plane surface. Refractive index of air nd=1.00000 is omitted in the description.

In [Various Data], FNO denotes an F-number, 2ω denotes an angle of view (unit "°"), Ymax denotes a maximum image height, TL denotes a total length of the variable magnification optical system (a distance on the optical axis from the first surface to the image plane I), and do denotes a variable interval between an n-th surface and an (n+1)-th surface. Meanwhile, W denotes the wide-angle end state, M denotes an intermediate focal length state, and T denotes the telephoto end state. ID denotes infinite distance upon focusing the infinite distance object, and CD denotes close distance upon focusing on a close distance object.

In [Lens Group Data], a starting surface ST and a focal length f are shown for each lens group.

In [Values for Conditional Expressions], values corresponding to respective conditional expressions in the variable magnification optical system according to the First Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The above-mentioned reference symbols in Table 1 are also employed in the same manner in Tables of the after-mentioned Examples.

TABLE 1

First Example

[Surface Data]

| m | r | d | nd | vd |
|---|---|---|---|---|
| OP | ∞ | | | |
| 1 | 127.6244 | 5.534 | 1.48749 | 70.31 |
| 2 | 1322.7608 | 0.200 | | |
| 3 | 99.4549 | 1.700 | 1.80610 | 33.34 |
| 4 | 62.2096 | 10.428 | 1.49700 | 81.73 |
| 5 | 3849.3448 | variable | | |
| 6 | 312.0349 | 1.000 | 1.77250 | 49.62 |
| 7 | 39.3277 | 8.235 | | |
| 8 | 38.7701 | 3.919 | 1.84666 | 23.80 |
| 9 | 103.1681 | 1.000 | 1.80400 | 46.60 |
| 10 | 48.5499 | 4.120 | | |

TABLE 1-continued

First Example

| | | | | |
|---|---|---|---|---|
| 11 | −74.2974 | 1.000 | 1.60311 | 60.69 |
| 12 | 649.2745 | variable | | |
| 13 | 44.7829 | 5.265 | 1.72342 | 38.03 |
| 14 | −98.4496 | 1.019 | | |
| 15 | 50.5480 | 5.402 | 1.49700 | 81.73 |
| 16 | −45.6249 | 1.000 | 1.90200 | 25.26 |
| 17 | 295.6528 | 2.002 | | |
| 18(Stop S) | ∞ | 8.326 | | |
| 19 | −54.0959 | 3.659 | 1.80518 | 25.45 |
| 20 | −21.1959 | 1.000 | 1.66755 | 41.87 |
| 21 | 58.7139 | 4.250 | | |
| 22 | −156.1142 | 1.000 | 1.90366 | 31.27 |
| 23 | 28.3088 | 5.794 | 1.61800 | 63.34 |
| 24 | −40.0487 | 0.200 | | |
| 25 | 36.9605 | 4.316 | 1.79952 | 42.09 |
| 26 | −382.7973 | variable | | |
| 27 | −306.2135 | 2.700 | 1.71736 | 29.57 |
| 28 | −50.1498 | 0.809 | | |
| 29 | −55.5576 | 1.000 | 1.69680 | 55.52 |
| 30 | 30.3235 | variable | | |
| 31 | 50.3470 | 3.397 | 1.60300 | 65.44 |
| 32 | 133.9533 | BF | | |
| I | ∞ | | | |

[Various Data]
Variable Magnification Ratio 2.69

| | W | M | T |
|---|---|---|---|
| f | 72.1 | 99.9 | 194.0 |
| FNO | 4.05 | 4.11 | 4.15 |
| 2ω | 33.86 | 24.12 | 12.32 |
| Ymax | 21.60 | 21.60 | 21.60 |
| TL | 218.32 | 218.32 | 218.32 |
| BF | 53.32 | 53.32 | 53.32 |

| | W ID | M ID | T ID | W CD | M CD | T CD |
|---|---|---|---|---|---|---|
| d5 | 2.000 | 19.906 | 51.627 | 2.000 | 19.906 | 51.627 |
| d12 | 51.627 | 33.721 | 2.000 | 51.627 | 33.721 | 2.000 |
| d26 | 3.000 | 5.594 | 7.658 | 3.569 | 6.412 | 9.301 |
| d30 | 20.101 | 17.507 | 15.442 | 19.532 | 16.689 | 13.800 |

[Lens Group Data]

| Group | ST | f |
|---|---|---|
| 1 | 1 | 154.325 |
| 2 | 6 | −45.859 |
| 3 | 13 | 45.676 |
| 4 | 27 | −42.922 |
| 5 | 31 | 131.760 |

[Values for Conditional Expressions]

(1) f2/f4 = 1.068
(2) f1/fw = 2.140
(3) (−f2)/f3 = 1.004
(4) f1/(−f2) = 3.365
(5) fP/(−fN) = 2.971
(6) |fvr|/f3 = 1.097

Figure 2A:
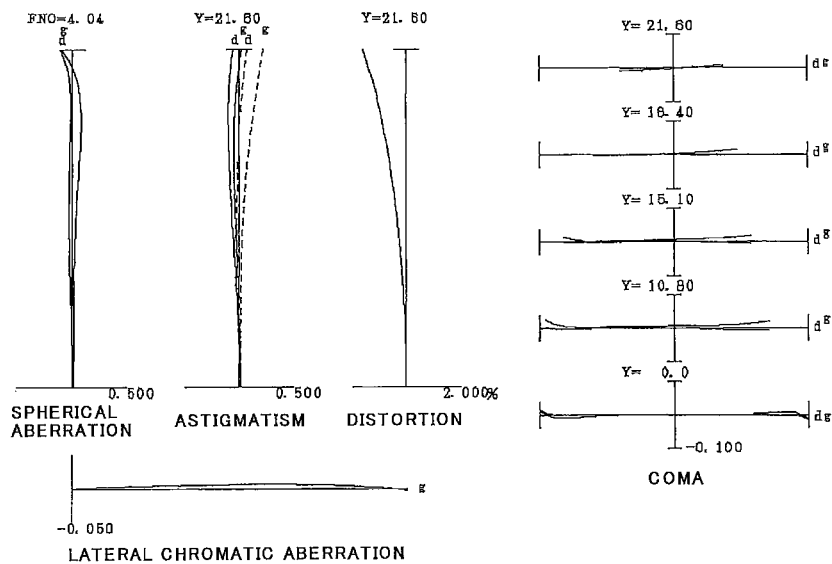
FIG. 2 are graphs showing various aberrations of the variable magnification optical system according to the First Example.
Figure 2B:
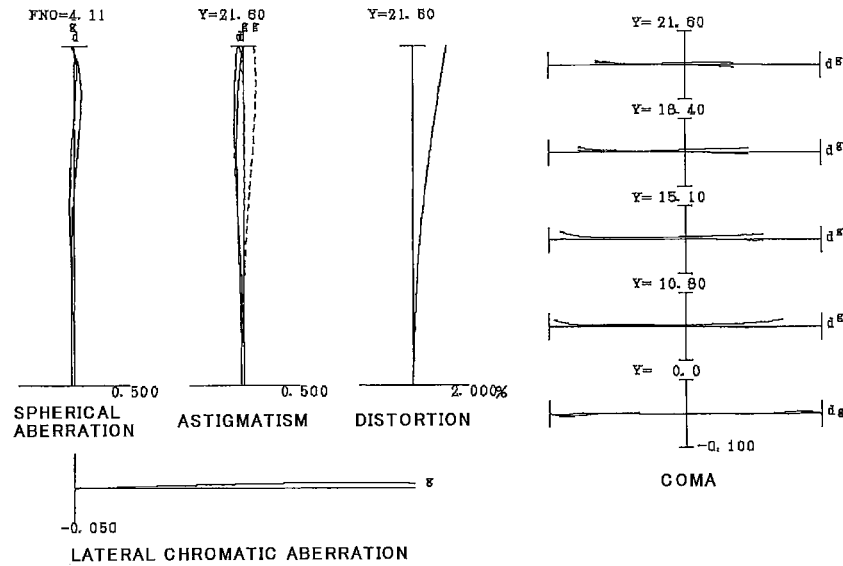
Figure 2C:
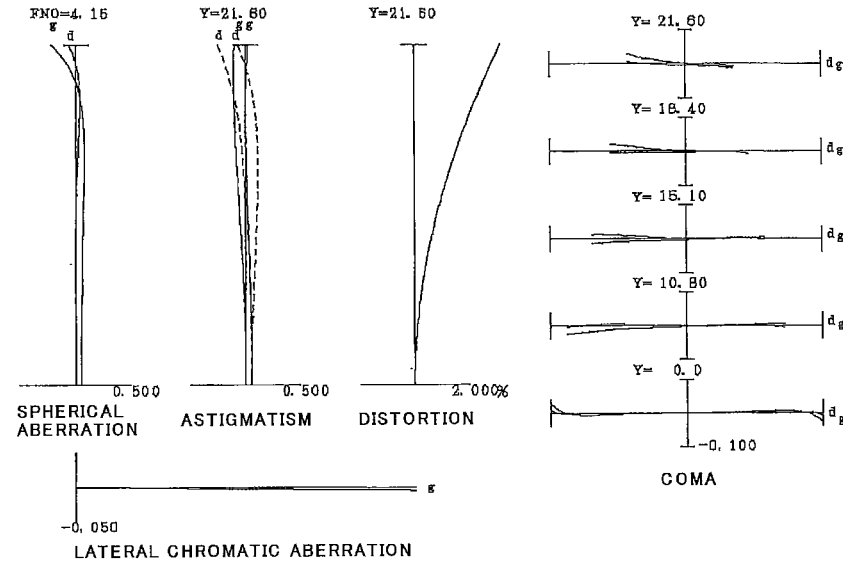

FIGS. 2A, 2B and 2C are graphs showing various aberrations of the variable magnification optical system according to the First Example upon focusing on an infinite distance object, in the wide-angle end state, in the intermediate focal length state, and in the telephoto end state, respectively.

Figure 3A:
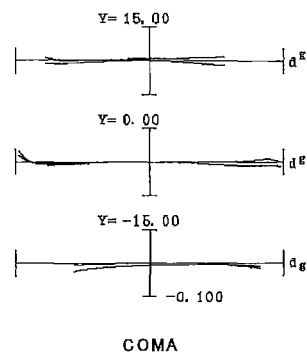
FIG. 3 are graphs showing meridional transverse aberrations of the variable magnification optical system according to the First Example.
Figure 3B:
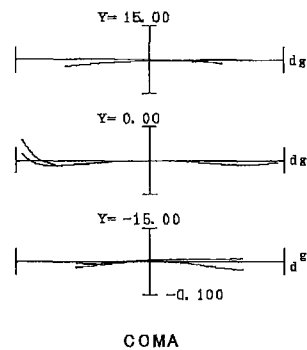

FIGS. 3A and 3B are, respectively, with respect to the variable magnification optical system according to the First Example, graphs showing meridional transverse aberrations at the time when vibration reduction is carried out for correcting rotational camera shake of 0.30 degrees upon focusing on the infinite distance object in the wide angle end state, and meridional transverse aberrations at the time when vibration reduction is carried out for correcting rotational camera shake of 0.20 degrees upon focusing on the infinite distance object in the telephoto end state.

Figure 4A:
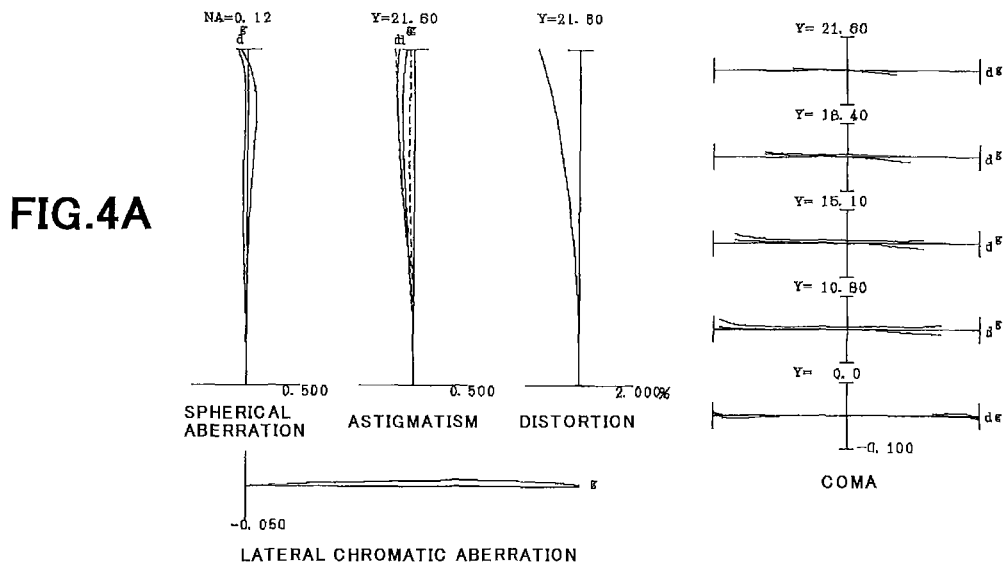
FIG. 4 are graphs showing various aberrations of the variable magnification optical system according to the First Example.
Figure 4B:
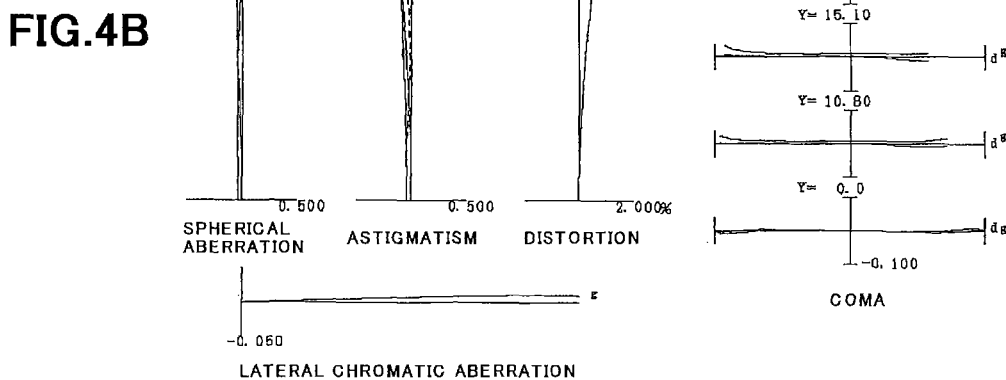
Figure 4C:
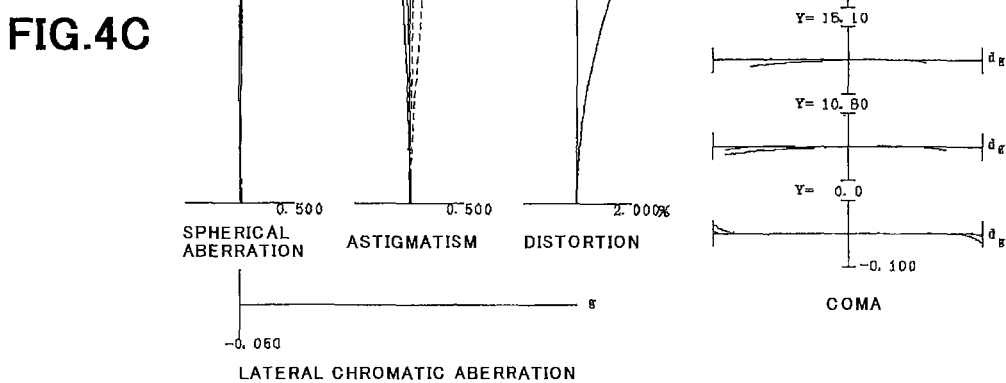

FIGS. 4A, 4B and 4C are, respectively, graphs showing various aberrations of the variable magnification optical system according to the First Example upon focusing on a close distance object, in which FIG. 4A is in the wide-angle end state, FIG. 4B is in the intermediate focal length state, and FIG. 4C is in the telephoto end state.

In respective graphs, FNO denotes an F-number, Y denotes an image height, and NA denotes numerical aperture. In detail, in the graph of spherical aberration, a value of F-number FNO corresponding to the maximum aperture is shown, or a value of numerical aperture NA is shown. In the graph of astigmatism and the graph of distortion, the maximum values of the image height Y are respectively shown. In the graph of coma aberration, values of respective image heights are shown. In respective graphs of aberrations, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In the graph of coma aberration, coma aberrations at respective image heights Y are shown.

Incidentally, the above-described explanation regarding various aberration graphs is the same with respect to the other Examples described hereinafter.

As is apparent from the respective graphs, the variable magnification optical system according to the present Example has superb optical performance as a result of good corrections to various aberrations from the wide-angle end state to the telephoto end state, and further excellent optical performance even upon carrying out vibration reduction as well as upon focusing on a close distance object.

Second Example

Figure 5:
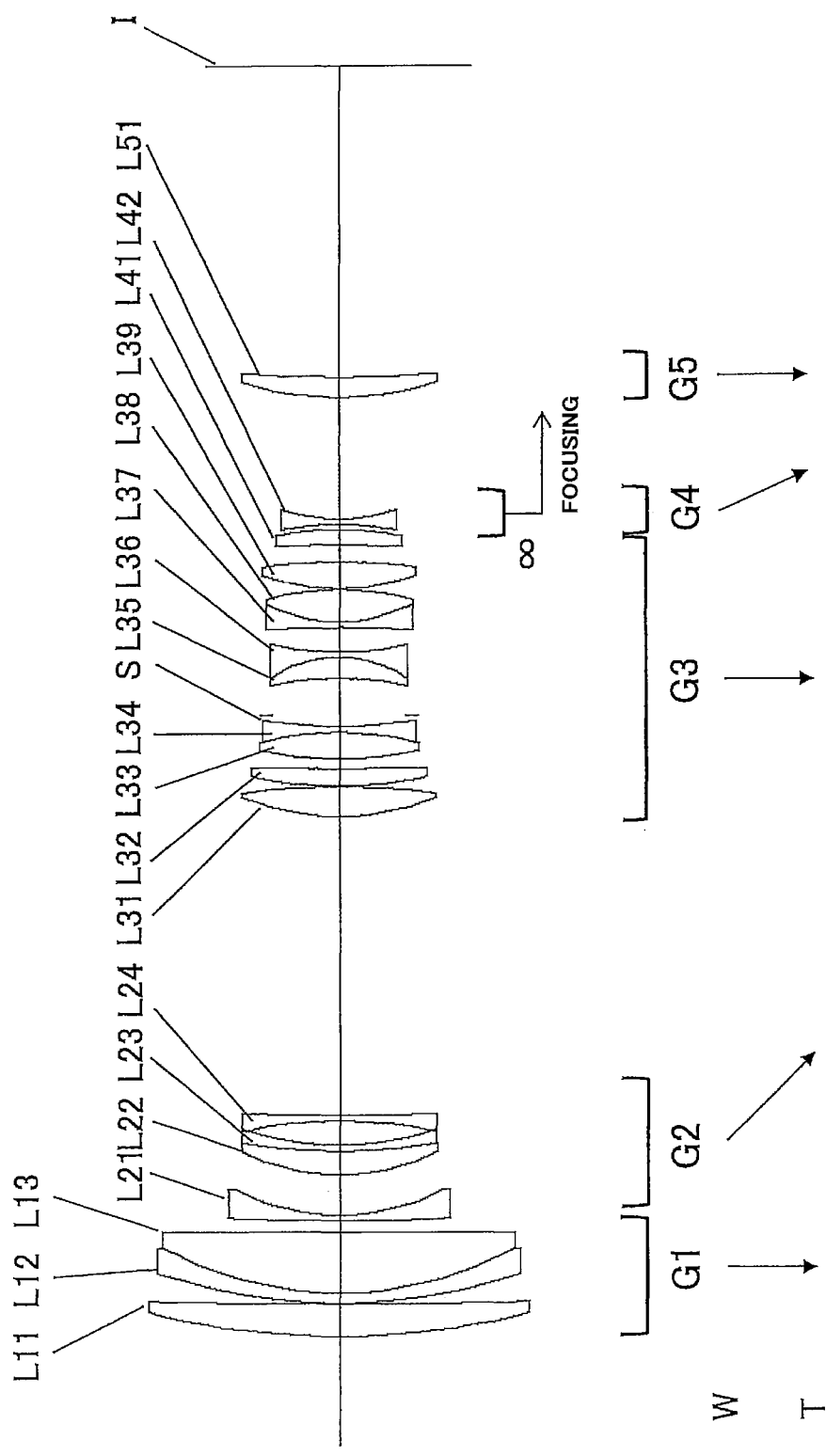
FIG. 5 is a sectional view showing a variable magnification optical system according to a Second Example.

FIG. 5 is a sectional view showing the variable magnification optical system according to the Second Example.

The variable magnification optical system according to the Second Example is composed of, in order from an object side, a first lens group G1 having positive refractive power, a second lens group G2 having negative refractive power, a third lens group G3 having positive refractive power, a fourth lens group G4 having negative refractive power and a fifth lens group G5 having positive refractive power.

The first lens group G1 consists of, in order from the object side, a positive meniscus lens L11 having a convex surface facing the object side, and a cemented positive lens constructed by a negative meniscus lens L12 having a convex surface facing the object side cemented with a double convex positive lens L13.

The second lens group G2 consists of, in order from the object side, a negative meniscus lens L21 having a convex surface facing the object side, a cemented positive lens constructed by a positive meniscus lens L22 having a convex surface facing the object side cemented with a negative meniscus lens L23 having a convex surface facing the object side, and a double concave negative lens L24.

The third lens group G3 consists of, in order from the object side, a double convex positive lens L31, a double convex positive lens L32, a cemented negative lens constructed by a double convex positive lens L33 cemented with a double concave negative lens L34, an aperture stop S, a cemented negative lens constructed by a positive meniscus lens L35 having a concave surface facing the object side cemented with a double concave negative lens L36, a cemented negative lens constructed by a double concave negative lens L37 cemented with a double convex positive lens L38, and a double convex positive lens L39.

The fourth lens group G4 consists of, in order from the object side, a positive meniscus lens L41 having a concave surface facing the object side and a double concave negative lens L42.

The fifth lens group G5 consists of a positive meniscus lens L51 having a convex surface facing the object side.

In the variable magnification optical system according to the Second Example, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied. At that time, the first lens group G1, the third lens group G3 and the fifth lens group G5 are fixed in positions with respect to the image plane I.

In the variable magnification optical system according to the Second Example, focusing from the infinite distance object to the close distance object is carried out by moving the fourth lens group G4 as a focusing lens group toward the image side along the optical axis.

In the variable magnification optical system according to the Second Example, the cemented negative lens constructed by the positive meniscus lens L35 and the negative lens L36, is moved as a vibration reduction lens to have a displacement component in a direction perpendicular to the optical axis, thereby carrying out vibration reduction.

Here, in the variable magnification optical system according to the Second Example, the vibration reduction coefficient in the wide-angle end state is 1.62, and the focal length is 72.10 (mm), so that the moving amount of the vibration reduction lens group for correcting a rotational camera shake of 0.30 degrees is 0.23 (mm). In the telephoto end state, the vibration reduction coefficient is 1.70, and the focal length is 194.00 (mm), so that the moving amount of the vibration reduction lens group for correcting a rotational camera shake of 0.20 degrees is 0.40 (mm).

Table 2 below shows various values associated with the variable magnification optical system according to the Second Example.

TABLE 2

Second Example

[Surface Data]

| m | r | d | nd | vd |
|---|---|---|---|---|
| OP | ∞ | | | |
| 1 | 131.1214 | 5.449 | 1.48749 | 70.31 |
| 2 | 1109.4966 | 0.200 | | |
| 3 | 98.0798 | 1.700 | 1.80610 | 33.34 |
| 4 | 61.5920 | 10.521 | 1.49700 | 81.73 |
| 5 | −7105.2636 | variable | | |
| 6 | 380.8979 | 1.000 | 1.77250 | 49.62 |
| 7 | 38.2124 | 6.936 | | |
| 8 | 38.1827 | 4.034 | 1.84666 | 23.80 |
| 9 | 101.8431 | 1.000 | 1.80400 | 46.60 |
| 10 | 49.6281 | 4.170 | | |
| 11 | −75.5321 | 1.000 | 1.60311 | 60.69 |
| 12 | 631.4782 | variable | | |

TABLE 2-continued

Second Example

| 13 | 43.3989 | 5.088 | 1.60300 | 65.44 |
|---|---|---|---|---|
| 14 | −128.0434 | 0.200 | | |
| 15 | 71.7117 | 2.953 | 1.84666 | 23.80 |
| 16 | 1360.1055 | 1.671 | | |
| 17 | 59.5261 | 4.661 | 1.49700 | 81.73 |
| 18 | −46.7718 | 1.000 | 1.90200 | 25.26 |
| 19 | 84.5350 | 1.820 | | |
| 20(Stop S) | ∞ | 6.448 | | |
| 21 | −52.0090 | 3.604 | 1.80518 | 25.45 |
| 22 | −20.4107 | 1.000 | 1.66755 | 41.87 |
| 23 | 58.3221 | 4.156 | | |
| 24 | −188.8475 | 1.000 | 1.90366 | 31.27 |
| 25 | 27.1167 | 5.505 | 1.61800 | 63.34 |
| 26 | −46.5152 | 0.200 | | |
| 27 | 39.9140 | 4.500 | 1.79952 | 42.09 |
| 28 | −111.0815 | variable | | |
| 29 | −249.2850 | 2.700 | 1.71736 | 29.57 |
| 30 | −47.0764 | 0.828 | | |
| 31 | −51.1491 | 1.000 | 1.69680 | 55.52 |
| 32 | 31.0004 | variable | | |
| 33 | 55.1958 | 3.487 | 1.60300 | 65.44 |
| 34 | 197.9712 | BF | | |
| I | ∞ | | | |

[Various Data]
Variable Magnification Ratio 2.69

| | W | M | T |
|---|---|---|---|
| f | 72.1 | 99.9 | 194.0 |
| FNO | 4.05 | 4.12 | 4.17 |
| 2ω | 33.82 | 24.08 | 12.30 |
| Ymax | 21.60 | 21.60 | 21.60 |
| TL | 218.32 | 218.32 | 218.32 |
| BF | 53.32 | 53.32 | 53.32 |

| | W ID | M ID | T ID | W CD | M CD | T CD |
|---|---|---|---|---|---|---|
| d5 | 2.000 | 19.764 | 51.257 | 2.000 | 19.764 | 51.257 |
| d12 | 51.257 | 33.494 | 2.000 | 51.257 | 33.494 | 2.000 |
| d28 | 3.000 | 5.617 | 7.657 | 3.569 | 6.435 | 9.297 |
| d32 | 20.913 | 18.296 | 16.256 | 20.344 | 17.479 | 14.616 |

[Lens Group Data]

| Group | ST | f |
|---|---|---|
| 1 | 1 | 152.488 |
| 2 | 6 | −45.554 |
| 3 | 13 | 45.955 |
| 4 | 29 | −42.595 |
| 5 | 33 | 125.767 |

[Values for Conditional Expressions]

(1) f2/f4 = 1.069
(2) f1/fw = 2.115
(3) (−f2)/f3 = 0.991
(4) f1/(−f2) = 3.347
(5) fP/(−fN) = 2.919
(6) |fvr|/f3 = 1.067

Figure 6A:
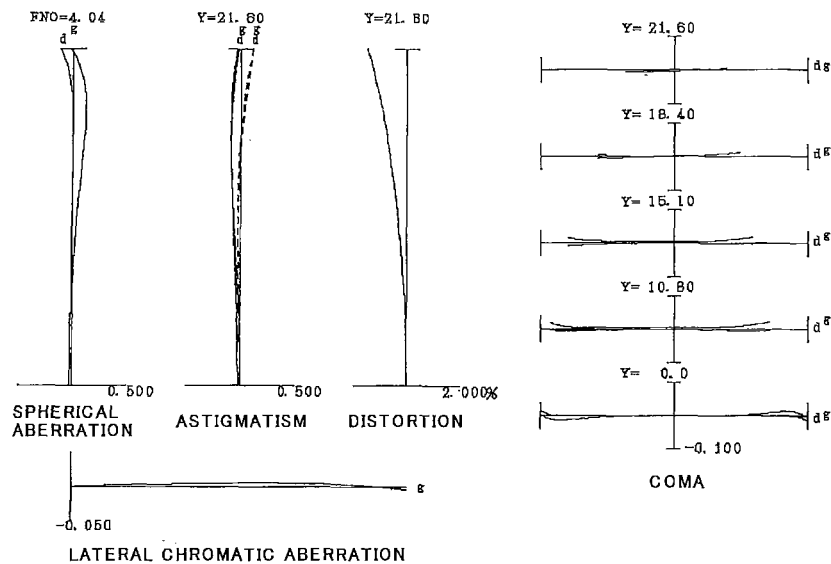
FIG. 6 are graphs showing various aberrations of the variable magnification optical system according to the Second Example.
Figure 6B:
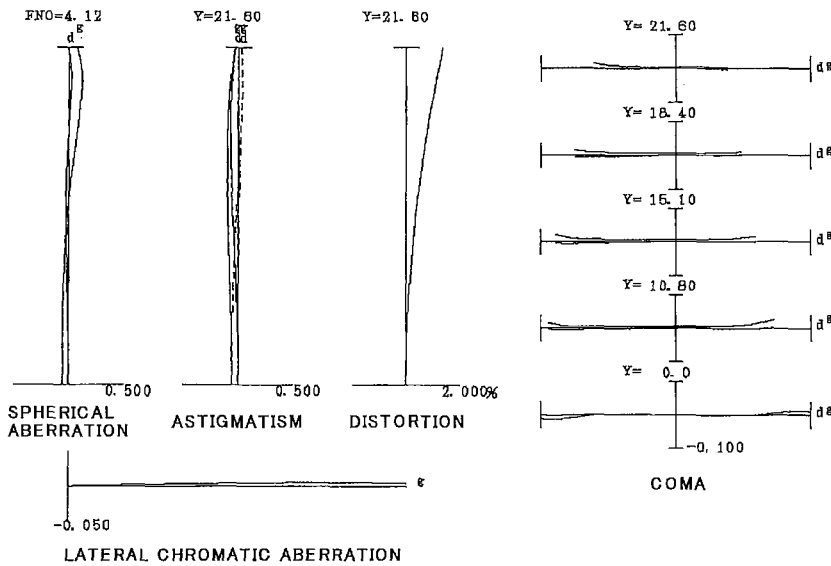
Figure 6C:
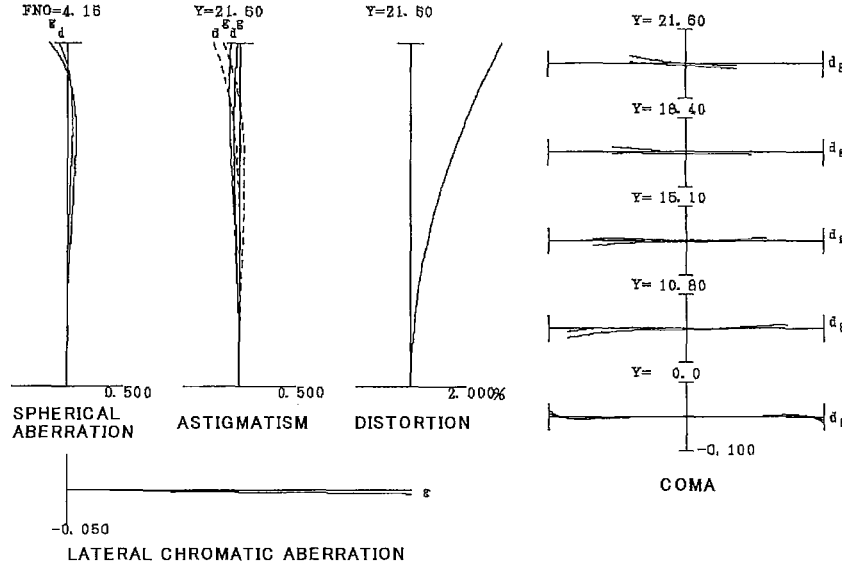

FIGS. 6A, 6B and 6C are graphs showing various aberrations of the variable magnification optical system according to the Second Example upon focusing on an infinite distance object, in the wide-angle end state, in the intermediate focal length state, and in the telephoto end state, respectively.

Figure 7A:
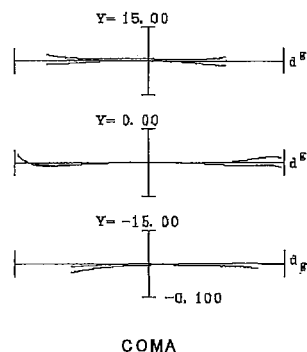
FIG. 7 are graphs showing meridional transverse aberrations of the variable magnification optical system according to the Second Example.
Figure 7B:
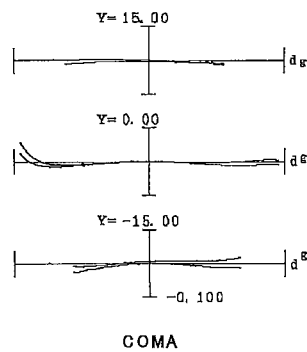

FIGS. 7A and 7B are, respectively, with respect to the variable magnification optical system according to the Second Example, graphs showing meridional transverse aberrations at the time when vibration reduction is carried out for correcting rotational camera shake of 0.30 degrees upon focusing on the infinite distance object in the wide angle end state, and meridional transverse aberrations at the time when vibration reduction is carried out for correcting rotational camera shake of 0.20 degrees upon focusing on the infinite distance object in the telephoto end state.

Figure 8A:
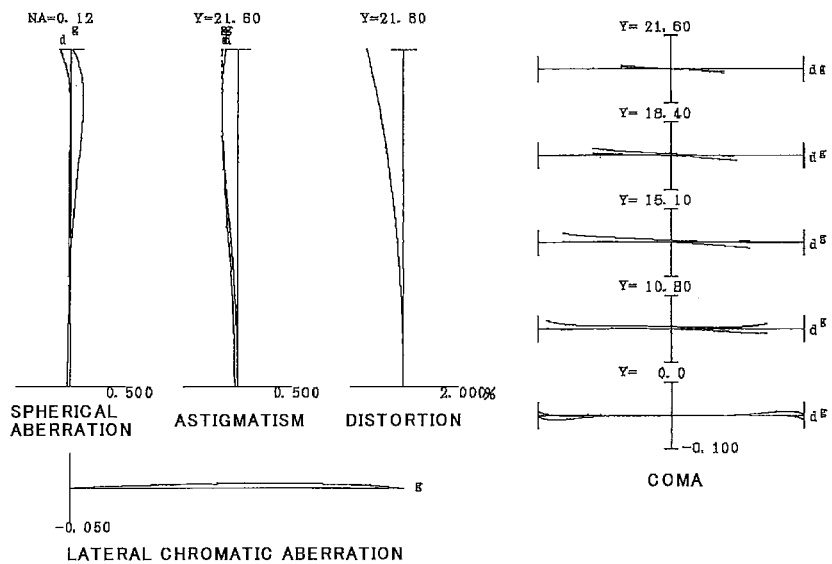
FIG. 8 are graphs showing various aberrations of the variable magnification optical system according to the Second Example.
Figure 8B:
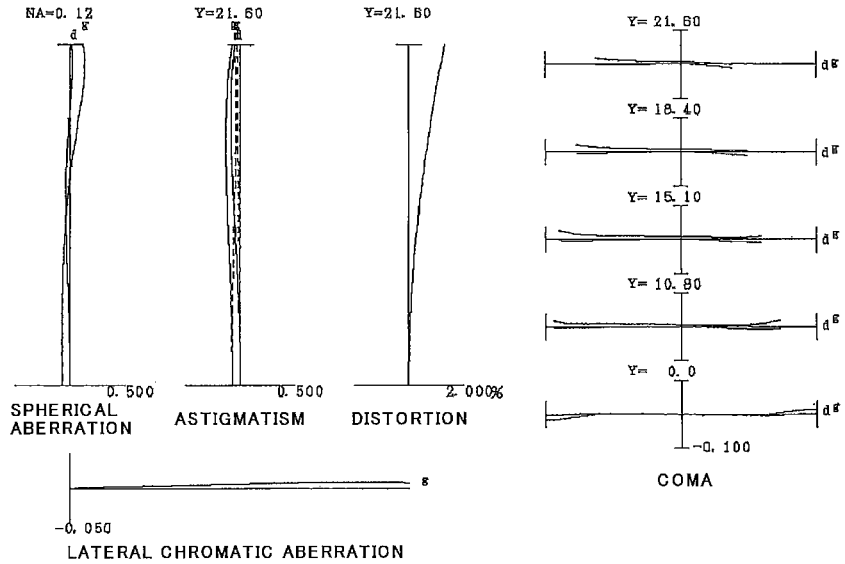
Figure 8C:
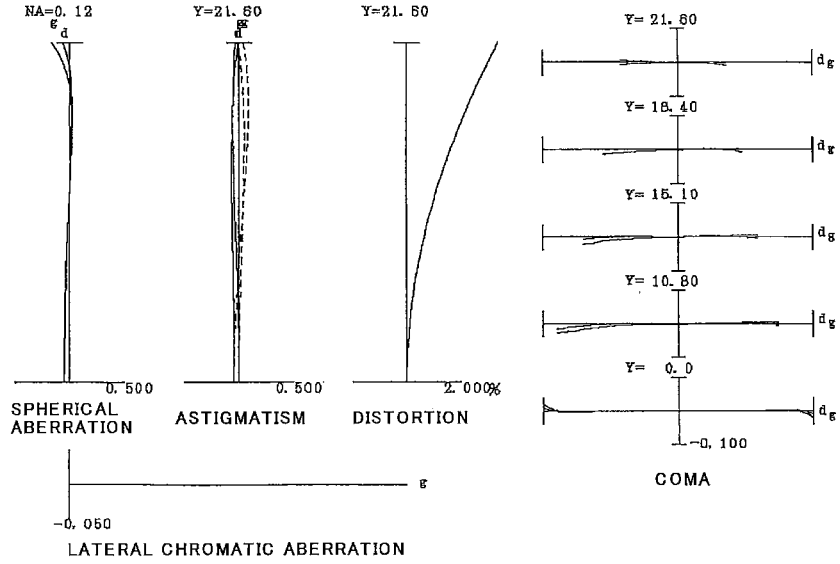

FIGS. 8A, 8B and 8C are, respectively, graphs showing various aberrations of the variable magnification optical system according to the Second Example upon focusing on a close distance object, in which FIG. 8A is in the wide-angle end state, FIG. 8B is in the intermediate focal length state, and FIG. 8C is in the telephoto end state.

As is apparent from the respective graphs, the variable magnification optical system according to the present Example has superb optical performance as a result of good corrections to various aberrations from the wide-angle end state to the telephoto end state, and further excellent optical performance even upon carrying out vibration reduction as well as upon focusing on a close distance object.

Third Example

Figure 9:
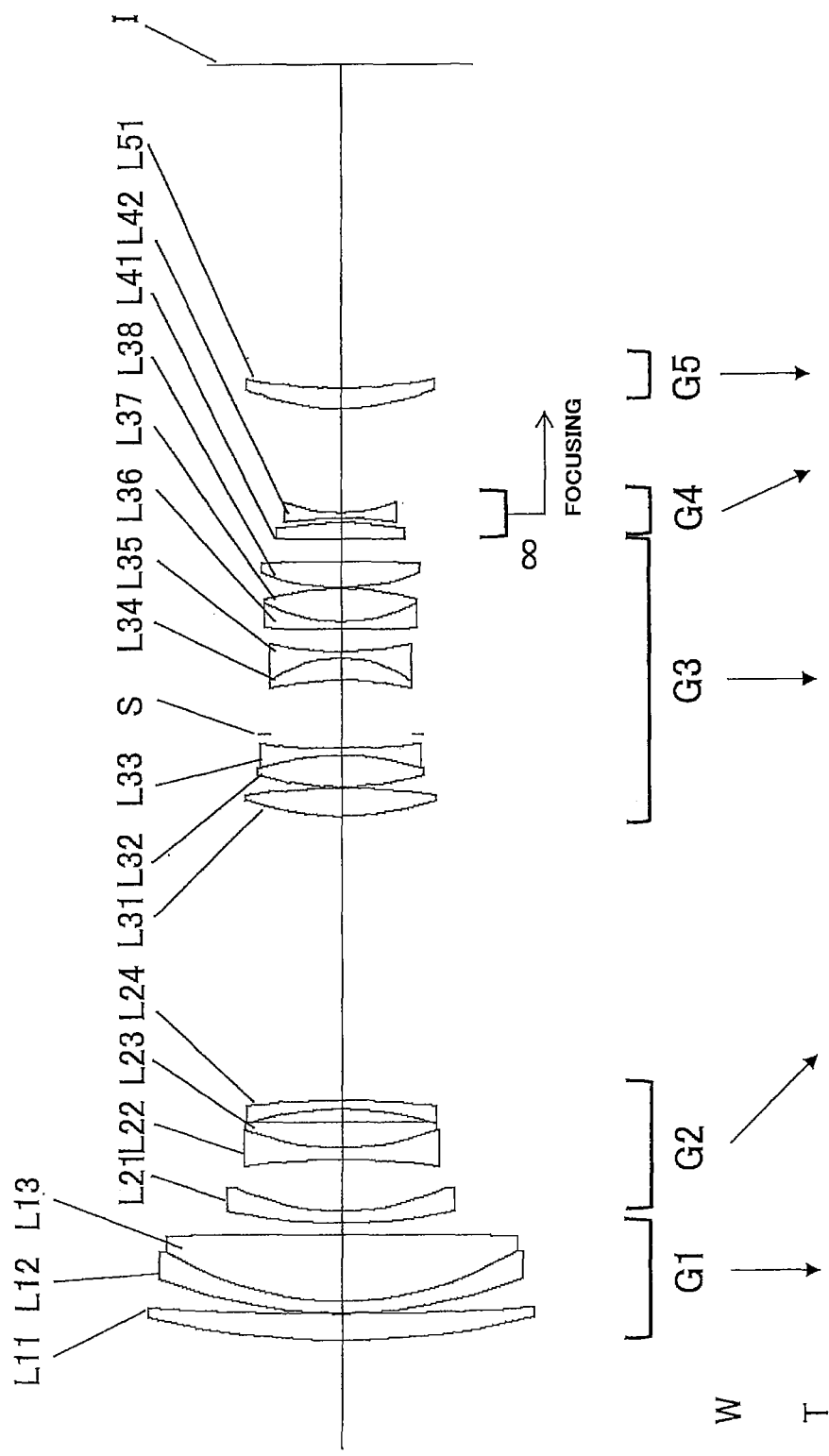
FIG. 9 is a sectional view showing a variable magnification optical system according to a Third Example.

FIG. 9 is a sectional view, showing the variable magnification optical system according to the Third Example.

The variable magnification optical system according to the Third Example is composed of, in order from an object side, a first lens group G1 having positive refractive power, a second lens group G2 having negative refractive power, a third lens group G3 having positive refractive power, a fourth lens group G4 having negative refractive power and a fifth lens group G5 having positive refractive power.

The first lens group G1 consists of, in order from the object side, a positive meniscus lens L11 having a convex surface facing the object side, and a cemented positive lens constructed by a negative meniscus lens L12 having a convex surface facing the object side cemented with a double convex positive lens L13.

The second lens group G2 consists of, in order from the object side, a negative meniscus lens L21 having a convex surface facing the object side, a cemented negative lens constructed by a double concave negative lens L22 having a convex surface facing the object side cemented with a positive meniscus lens L23 having a convex surface facing the object side, and a negative meniscus lens L24 having a concave surface facing the object side.

The third lens group G3 consists of, in order from the object side, a double convex positive lens L31, a cemented negative lens constructed by a double convex positive lens L32 cemented with a double concave negative lens L33, an aperture stop S, a cemented negative lens constructed by a positive meniscus lens L34 having a concave surface facing the object side cemented with a double concave negative lens L35, a cemented positive lens constructed by a negative meniscus lens L36 having a concave surface facing the object side cemented with a double convex positive lens L37, and a double convex positive lens L39.

The fourth lens group G4 consists of, in order from the object side, a positive meniscus lens L41 having a concave surface facing the object side and a double concave negative lens L42.

The fifth lens group G5 consists of a positive meniscus lens L51 having a convex surface facing the object side.

In the variable magnification optical system according to the Third Example, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5, are varied. Meanwhile, at this time, the first lens group G1, the third lens group G3 and fifth lens group G5 are fixed in positions with respect to the image plane I.

In the variable magnification optical system according to the Third Example, focusing from the infinite distance object to the close distance object is carried out by moving the fourth lens group G4 as a focusing lens group toward the image side along the optical axis.

In the variable magnification optical system according to the Third Example, the cemented negative lens constructed by the positive meniscus lens L34 and the negative lens L35 is moved as a vibration reduction lens to have a displacement component in a direction perpendicular to the optical axis, thereby carrying out vibration reduction.

Here, in the wide-angle end state in the Third Example, the vibration reduction coefficient is 1.63, and the focal length is 72.10 (mm), so that the moving amount of the vibration reduction lens group for correcting a rotational camera shake of 0.30 degrees is 0.23 (mm). In the telephoto end state, the vibration reduction coefficient is 1.70, and the focal length is 194.00 (mm), so that the moving amount of the vibration reduction lens group for correcting a rotational camera shake of 0.20 degrees is 0.40 (mm).

Table 3 below shows various values associated with the variable magnification optical system according to the Third Example.

TABLE 3

Third Example

[Surface Data]

| m | r | d | nd | vd |
|---|---|---|---|---|
| OP | ∞ | | | |
| 1 | 141.1591 | 4.500 | 1.48749 | 70.31 |
| 2 | 543.1898 | 0.200 | | |
| 3 | 85.6758 | 2.000 | 1.80610 | 33.34 |
| 4 | 57.2066 | 11.246 | 1.49700 | 81.73 |
| 5 | −1626.1596 | variable | | |
| 6 | 93.2280 | 2.000 | 1.83400 | 37.18 |
| 7 | 41.8983 | 8.938 | | |
| 8 | −115.2692 | 2.000 | 1.69680 | 55.52 |
| 9 | 44.2262 | 4.356 | 1.84666 | 23.80 |
| 10 | 27715.4320 | 2.322 | | |
| 11 | −55.6670 | 1.500 | 1.80400 | 46.60 |
| 12 | −129.1012 | variable | | |
| 13 | 49.0208 | 4.818 | 1.80100 | 34.92 |
| 14 | −105.6641 | 0.200 | | |
| 15 | 48.2516 | 5.297 | 1.49700 | 81.73 |
| 16 | −49.0156 | 1.300 | 1.90200 | 25.26 |
| 17 | 127.8612 | 2.373 | | |
| 18(Stop S) | ∞ | 9.279 | | |
| 19 | −58.0260 | 3.765 | 1.80518 | 25.45 |
| 20 | −21.3498 | 1.200 | 1.66755 | 41.87 |
| 21 | 55.2645 | 3.937 | | |
| 22 | 953.3728 | 1.200 | 1.90366 | 31.27 |
| 23 | 28.8503 | 5.672 | 1.60300 | 65.44 |
| 24 | −48.6329 | 0.200 | | |
| 25 | 36.9235 | 4.531 | 1.77250 | 49.62 |
| 26 | −308.8274 | variable | | |
| 27 | −687.7351 | 2.700 | 1.71736 | 29.57 |
| 28 | −56.8272 | 0.787 | | |

TABLE 3-continued

Third Example

| 29 | −65.5667 | 1.000 | 1.69680 | 55.52 |
|----|----------|-------|---------|-------|
| 30 | 28.2486 | variable | | |
| 31 | 41.4926 | 3.492 | 1.60300 | 65.44 |
| 32 | 88.2133 | BF | | |
| I | ∞ | | | |

[Various Data]
Variable Magnification Ratio 2.69

| | W | M | T |
|---|---|---|---|
| f | 72.1 | 99.9 | 194.0 |
| FNO | 4.09 | 4.13 | 4.16 |
| 2ω | 34.18 | 24.28 | 12.40 |
| Ymax | 21.60 | 21.60 | 21.60 |
| TL | 218.32 | 218.32 | 218.32 |
| BF | 55.22 | 55.22 | 55.22 |

| | W ID | M ID | T ID | W CD | M CD | T CD |
|---|---|---|---|---|---|---|
| d5 | 2.000 | 18.794 | 48.567 | 2.000 | 18.794 | 48.567 |
| d12 | 48.567 | 31.773 | 2.000 | 48.567 | 31.773 | 2.000 |
| d26 | 3.920 | 6.471 | 7.964 | 4.497 | 7.299 | 9.612 |
| d30 | 17.798 | 15.247 | 13.754 | 17.221 | 14.419 | 12.106 |

[Lens Group Data]

| Group | ST | f |
|-------|----|---|
| 1 | 1 | 145.325 |
| 2 | 6 | −43.336 |
| 3 | 13 | 45.621 |
| 4 | 27 | −42.711 |
| 5 | 31 | 126.368 |

[Values for Conditional Expressions]

(1) f2/f4 = 1.015
(2) f1/fw = 2.016
(3) (−f2)/f3 = 0.950
(4) f1/(−f2) = 3.353
(5) fP/(−fN) = 3.056
(6) |fvr|/f3 = 1.111

Figure 10A:
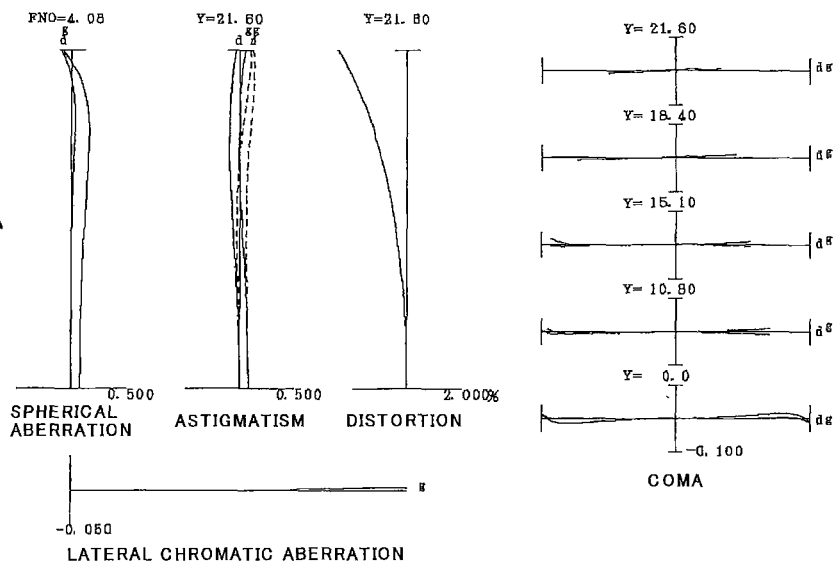
FIG. 10 are graphs showing various aberrations of the variable magnification optical system according to the Third Example.
Figure 10B:
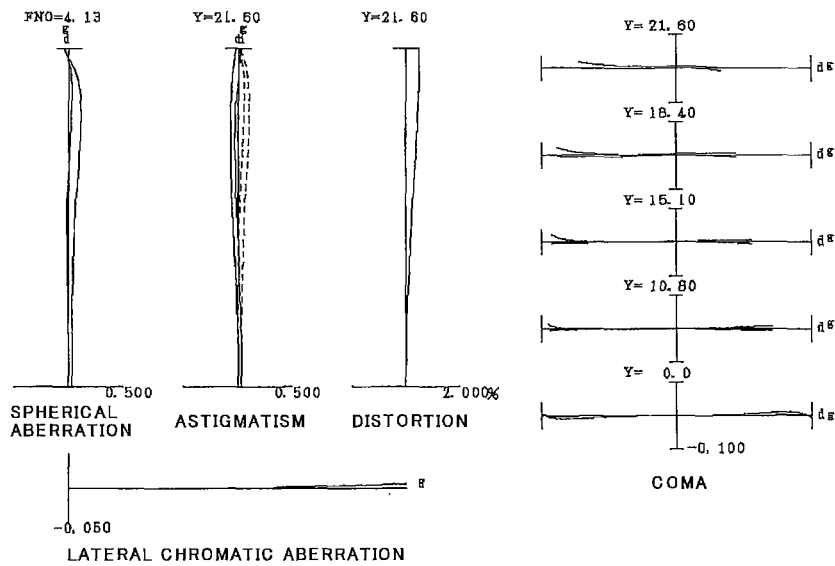
Figure 10C:
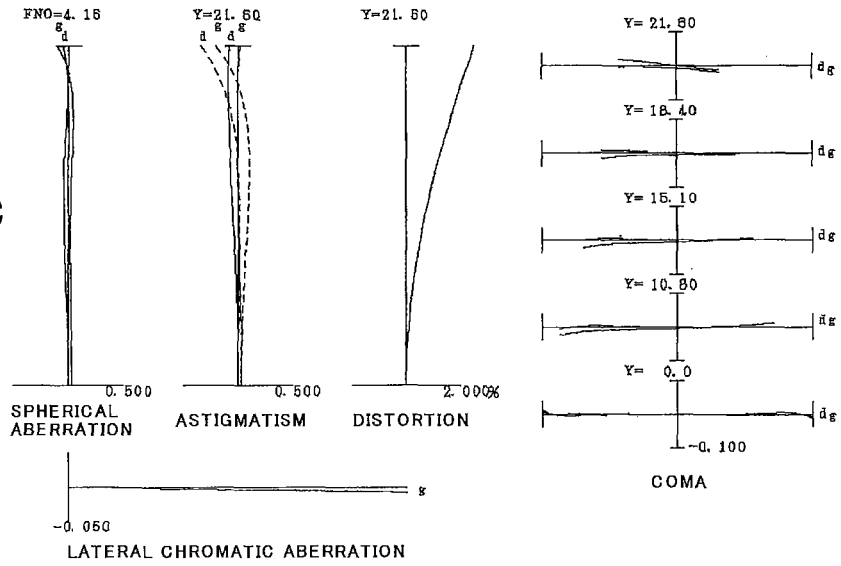
Figure 11A:
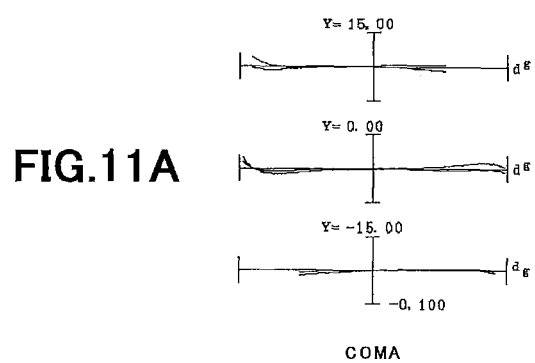
FIG. 11 are graphs showing meridional transverse aberrations of the variable magnification optical system according to the Third Example.
Figure 11B:
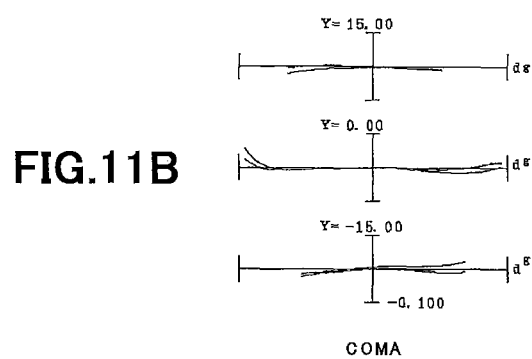

FIGS. 10A, 10B and 10C are graphs showing various aberrations of the variable magnification optical system according to the Third Example upon focusing on an infinite distance object, in the wide-angle end state, in the intermediate focal length state, and in the telephoto end state, respectively. FIGS. 11A and 11B are, respectively, with respect to the variable magnification optical system according to the Third Example, graphs showing meridional transverse aberrations at the time when vibration reduction is carried out for correcting rotational camera shake of 0.30 degrees upon focusing on the infinite distance object in the wide angle end state, and meridional transverse aberrations at the time when vibration reduction is carried out for correcting rotational camera shake of 0.20 degrees upon focusing on the infinite distance object in the telephoto end state.

Figure 12A:
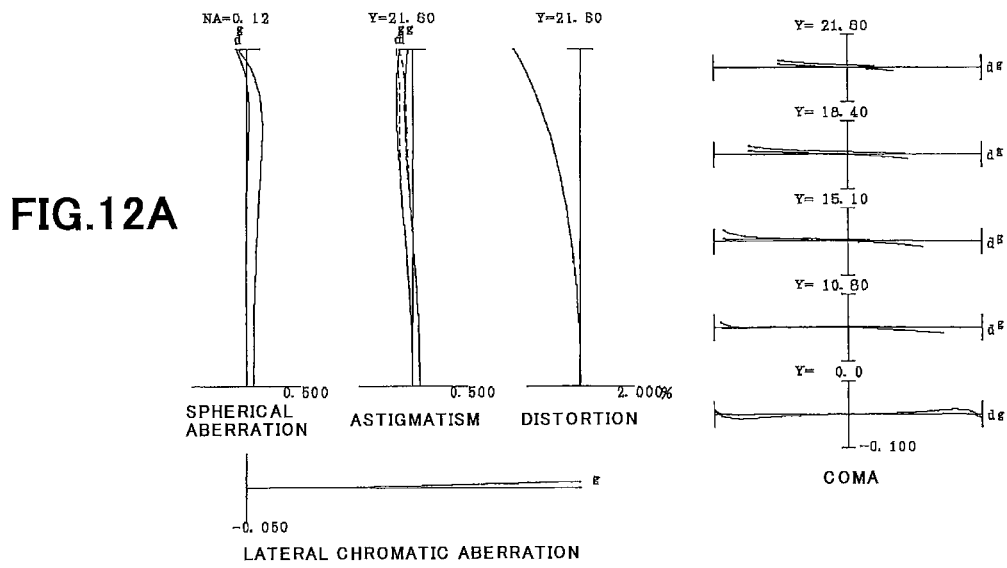
FIG. 12 are graphs showing various aberrations of the variable magnification optical system according to the Third Example.
Figure 12B:
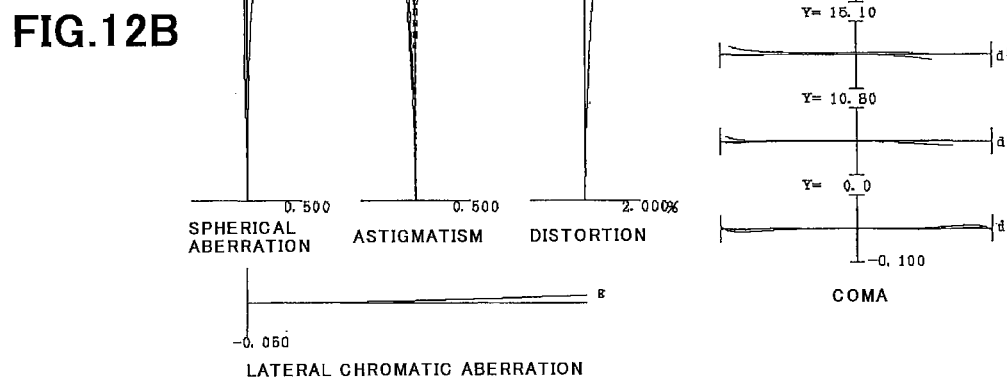
Figure 12C:
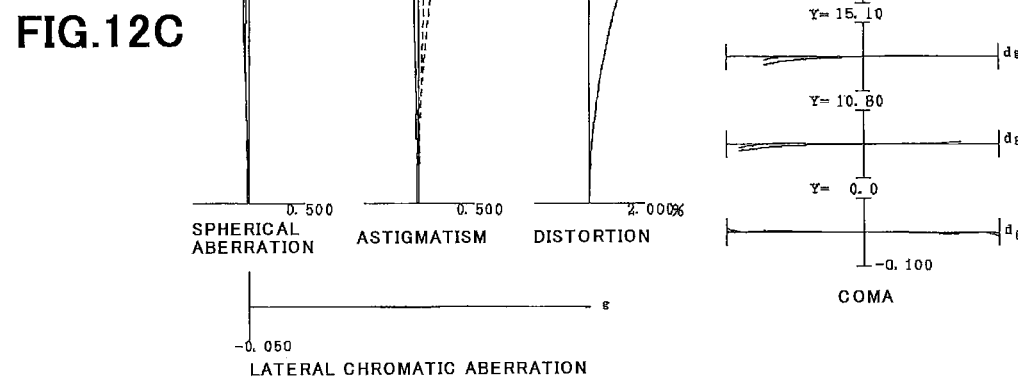

FIGS. 12A, 12B and 12C are, respectively, graphs showing various aberrations of the variable magnification optical system according to the Third Example upon focusing on a close distance object, in which FIG. 12A is in the wide-angle end state, FIG. 12B is in the intermediate focal length state, and FIG. 12C is in the telephoto end state.

As is apparent from the respective graphs, the variable magnification optical system according to the present Example has superb optical performance as a result of good corrections to various aberrations from the wide-angle end state to the telephoto end state, and further excellent optical performance even upon carrying out vibration reduction as well as upon focusing on a close distance object.

Fourth Example

Figure 13:
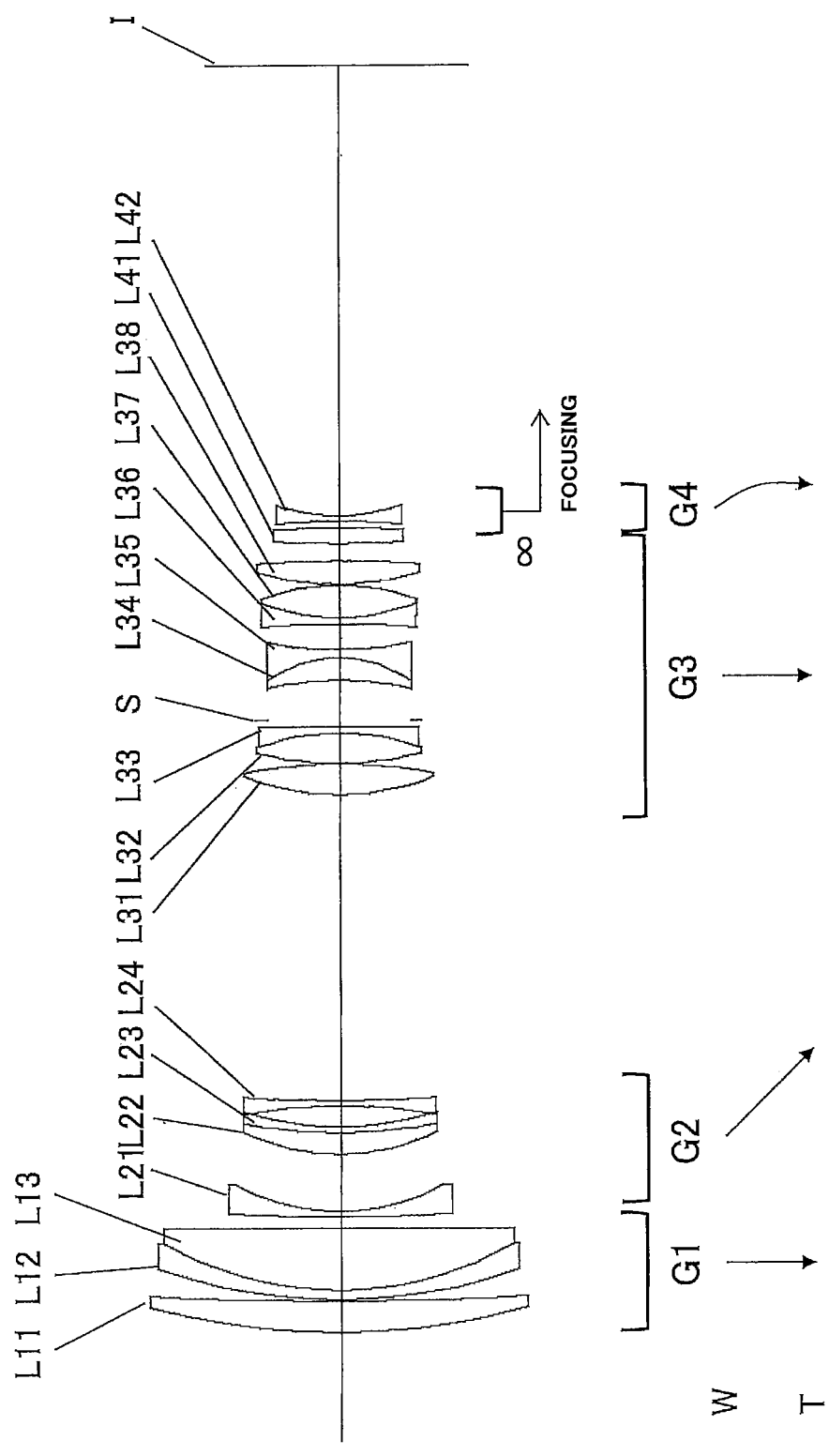
FIG. 13 is a sectional view showing a variable magnification optical system according to a Fourth Example.

FIG. 13 is a sectional view, showing the variable magnification optical system according to the Fourth Example.

The variable magnification optical system according to the Fourth Example is composed of, in order from an object side, a first lens group G1 having positive refractive power, a second lens group G2 having negative refractive power, a third lens group G3 having positive refractive power, and a fourth lens group G4 having negative refractive power.

The first lens group G1 consists of, in order from the object side, a positive meniscus lens L11 having a convex surface facing the object side, and a cemented positive lens constructed by a negative meniscus lens L12 having a convex surface facing the object side cemented with a positive meniscus lens L13 having a convex surface facing the object side.

The second lens group G2 consists of, in order from the object side, a negative meniscus lens L21 having a convex surface facing the object side, a cemented positive lens constructed by a positive meniscus lens L22 having a convex surface facing the object side cemented with a negative meniscus lens L23 having a convex surface facing the object side, and a double concave negative lens L24.

The third lens group G3 consists of, in order from the object side, a double convex positive lens L31, a cemented negative lens constructed by a double convex positive lens L32 cemented with a double concave negative lens L33, an aperture stop S, a cemented negative lens constructed by a positive meniscus lens L34 having a concave surface facing the object side cemented with a double concave negative lens L35, a cemented positive lens constructed by a double concave negative lens L36 cemented with a double convex positive lens L37, and a double convex positive lens L38.

The fourth lens group G4 consists of, in order from the object side, a double convex positive lens L41 and a double concave negative lens L42.

In the variable magnification optical system according to the Fourth Example, upon varying magnification from the wide angle end state to the telephoto end state, the second lens group G2 and the fourth lens group G4 are moved along the optical axis such that a distance between the first lens group G1 and the second lens group G2, a distance between the second lens group G2 and the third lens group G3, and a distance between the third lens group G3 and the fourth lens group G4, are varied. Meanwhile, at that time, the first lens group G1 and the third lens group G3 are fixed in positions with respect to the image plane I.

In the variable magnification optical system according to the Fourth Example, focusing from the infinite distance object to the close distance object is carried out by moving the fourth lens group G4 as a focusing lens group toward the image side along the optical axis.

In the variable magnification optical system according to the Fourth Example, the cemented negative lens constructed by the positive meniscus lens L34 and the negative lens L35, is moved as a vibration reduction lens to have a displacement component in a direction perpendicular to the optical axis, thereby carrying out vibration reduction.

Here, in the wide-angle end state of the variable magnification optical system according to the Fourth Example, the vibration reduction coefficient is 1.68, and the focal length is 72.10 (mm), so that the moving amount of the vibration reduction lens group for correcting a rotational camera shake of 0.30 degrees is 0.22 (mm). In the telephoto end state, the vibration reduction coefficient is 1.70, and the focal length is 194.00 (mm), so that the moving amount of the vibration reduction lens group for correcting a rotational camera shake of 0.20 degrees is 0.40 (mm).

Table 4 below shows various values associated with the variable magnification optical system according to the Fourth Example.

TABLE 4

Fourth Example

[Surface Data]

| m | r | d | nd | νd |
|---|---|---|---|---|
| OP | ∞ | | | |
| 1 | 122.9116 | 5.364 | 1.48749 | 70.31 |
| 2 | 642.7135 | 0.200 | | |
| 3 | 93.7360 | 1.700 | 1.80610 | 33.34 |
| 4 | 60.6328 | 10.593 | 1.49700 | 81.73 |
| 5 | 4543.6426 | variable | | |
| 6 | 289.4140 | 1.000 | 1.77250 | 49.62 |
| 7 | 37.2424 | 9.821 | | |
| 8 | 38.9626 | 3.720 | 1.84666 | 23.80 |
| 9 | 91.2165 | 1.000 | 1.80400 | 46.60 |
| 10 | 52.4749 | 3.560 | | |
| 11 | −100.3987 | 1.000 | 1.60311 | 60.69 |
| 12 | 253.6299 | variable | | |
| 13 | 44.5612 | 5.223 | 1.66446 | 35.87 |
| 14 | −90.1338 | 0.200 | | |
| 15 | 59.0915 | 5.257 | 1.49700 | 81.73 |
| 16 | −42.3802 | 1.000 | 1.90200 | 25.26 |
| 17 | 593.6378 | 1.136 | | |
| 18(Stop S) | ∞ | 6.982 | | |
| 19 | −54.8344 | 3.877 | 1.80518 | 25.45 |
| 20 | −21.3112 | 1.420 | 1.66755 | 41.87 |
| 21 | 63.0651 | 4.382 | | |
| 22 | −154.1165 | 1.000 | 1.90366 | 31.27 |
| 23 | 34.7644 | 5.687 | 1.60300 | 65.44 |
| 24 | −40.7282 | 0.200 | | |
| 25 | 46.6093 | 4.036 | 1.80400 | 46.60 |
| 26 | −182.7333 | variable | | |
| 27 | 191.1371 | 2.700 | 1.84666 | 23.80 |
| 28 | −192.1184 | 1.091 | | |
| 29 | −151.1748 | 1.000 | 1.61772 | 49.81 |
| 30 | 34.1179 | BF | | |
| I | ∞ | | | |

[Various Data]
Variable Magnification Ratio 2.69

| | W | M | T |
|---|---|---|---|
| f | 72.1 | 99.7 | 194.0 |
| FNO | 4.14 | 4.17 | 4.17 |
| 2ω | 33.30 | 23.84 | 12.20 |
| Ymax | 21.60 | 21.60 | 21.60 |
| TL | 218.32 | 218.32 | 218.32 |
| BF | 77.52 | 74.71 | 75.11 |

| | W ID | M ID | T ID | W CD | M CD | T CD |
|---|---|---|---|---|---|---|
| d5 | 2.000 | 20.205 | 52.654 | 2.000 | 20.205 | 52.654 |
| d12 | 52.654 | 34.449 | 2.000 | 52.654 | 34.449 | 2.000 |
| d26 | 3.000 | 5.810 | 5.410 | 3.821 | 7.008 | 7.750 |

[Lens Group Data]

| Group | ST | f |
|---|---|---|
| 1 | 1 | 150.995 |
| 2 | 6 | −48.062 |

TABLE 4-continued

Fourth Example

| 3 | 13 | 47.483 |
|---|---|---|
| 4 | 27 | −77.084 |

[Values for Conditional Expressions]

(1) f2/f4 = 0.624
(2) f1/fw = 2.094
(3) (−f2)/f3 = 1.012
(4) f1/(−f2) = 3.142
(5) fP/(−fN) = 2.525
(6) |fvr|/f3 = 1.108

Figure 14A:
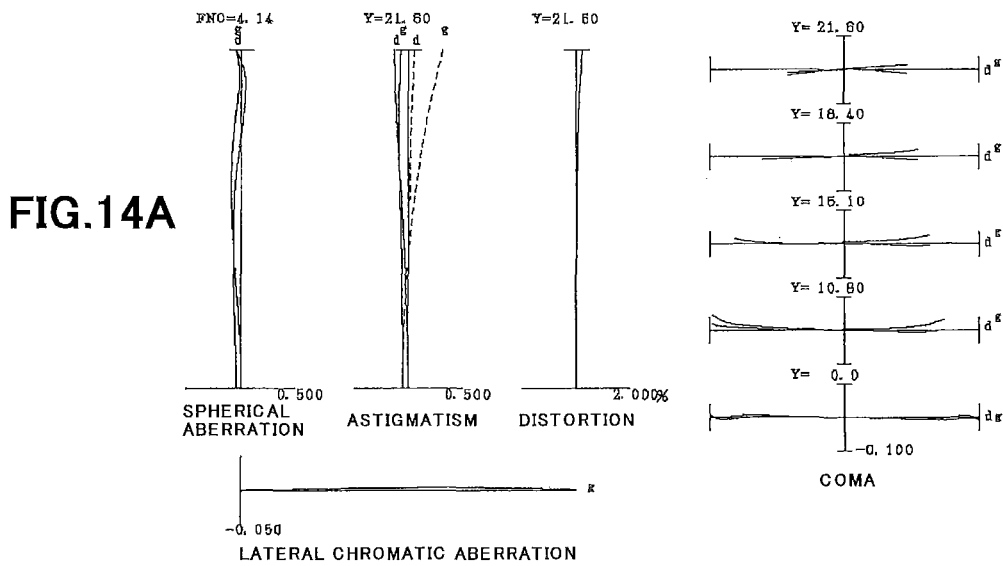
FIG. 14 are graphs showing various aberrations of the variable magnification optical system according to the Fourth Example.
Figure 14B:
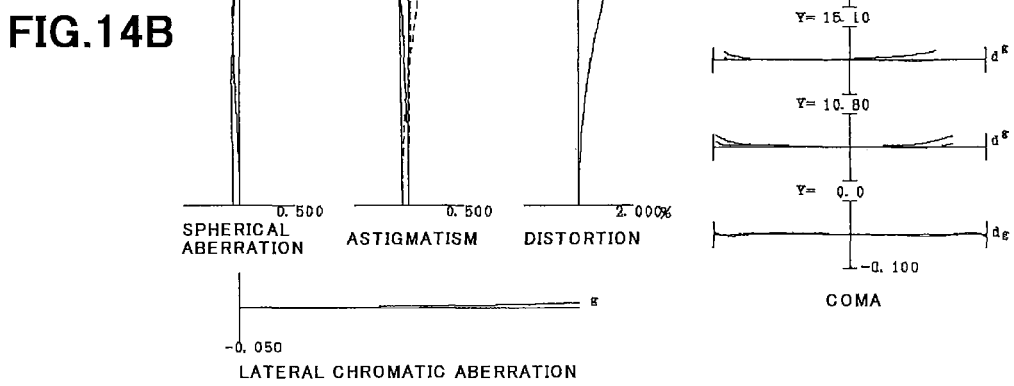
Figure 14C:
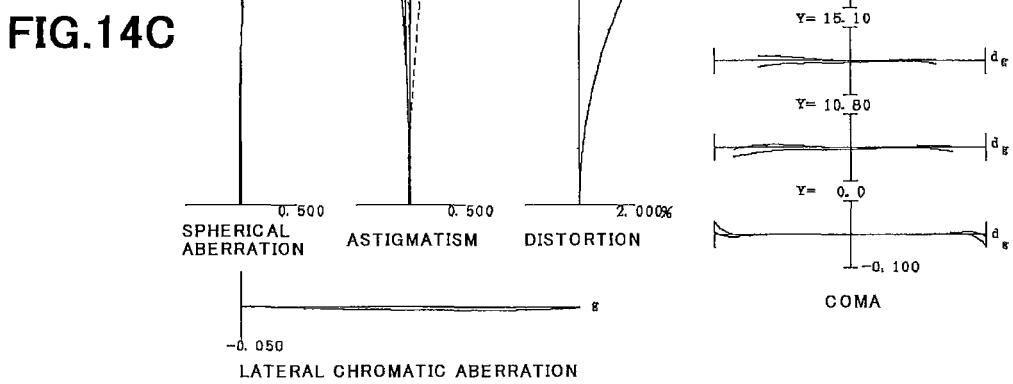
Figure 15A:
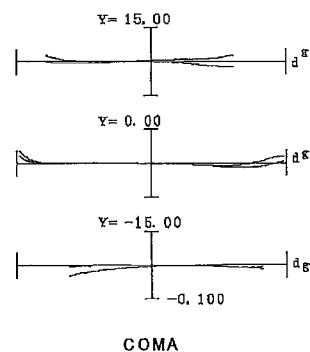
FIG. 15 are graphs showing meridional transverse aberrations of the variable magnification optical system according to the Fourth Example.
Figure 15B:
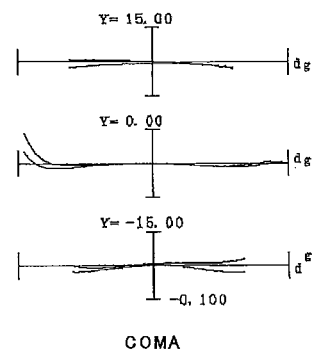

FIGS. 14A, 14B and 14C are graphs showing various aberrations of the variable magnification optical system according to the Fourth Example upon focusing on an infinite distance object, in the wide-angle end state, in the intermediate focal length state, and in the telephoto end state, respectively. FIGS. 15A and 15B are, respectively, with respect to the variable magnification optical system according to the Fourth Example, graphs showing meridional transverse aberrations at the time when vibration reduction is carried out for correcting rotational camera shake of 0.30 degrees upon focusing on the infinite distance object in the wide angle end state, and meridional transverse aberrations at the time when vibration reduction is carried out for correcting rotational camera shake of 0.20 degrees upon focusing on the infinite distance object in the telephoto end state.

Figure 16A:
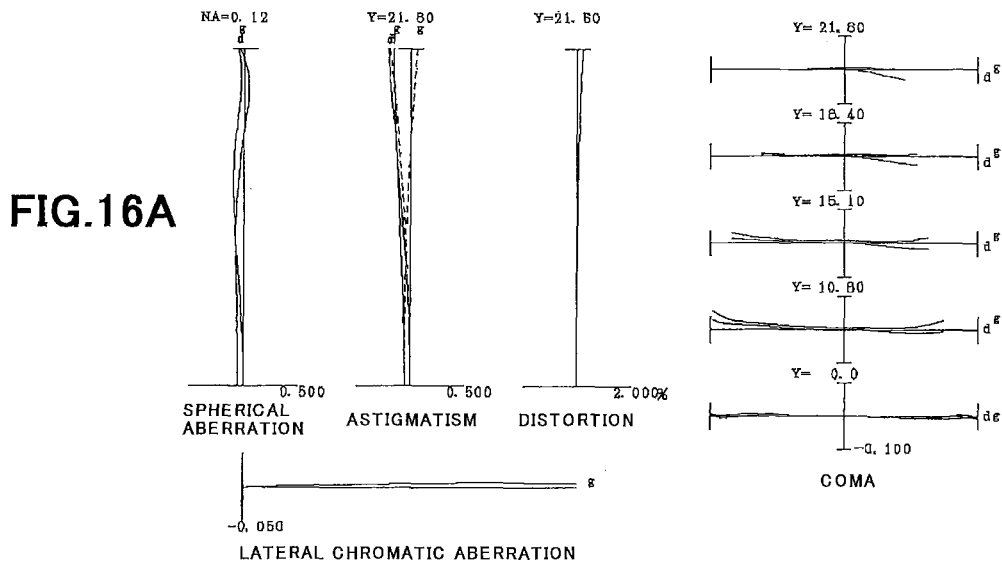
FIG. 16 are graphs showing various aberrations of the variable magnification optical system according to the Fourth Example.
Figure 16B:
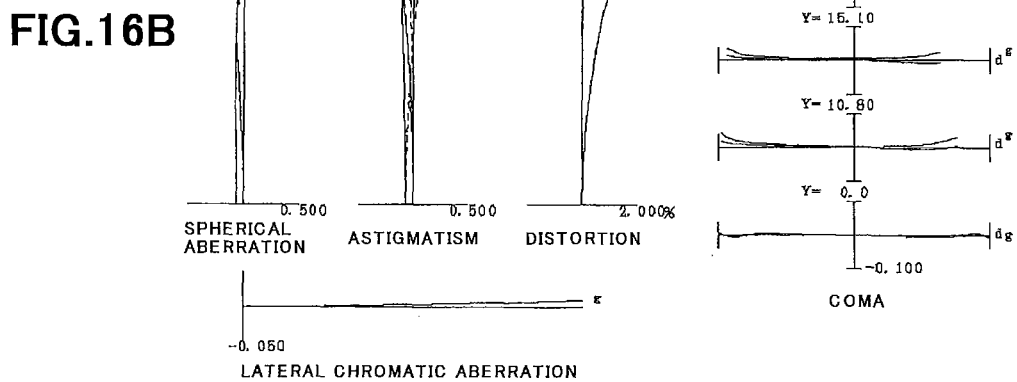
Figure 16C:
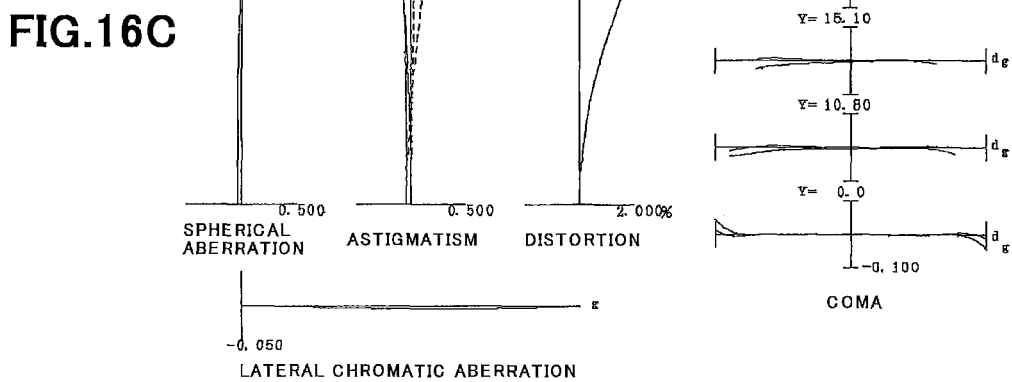

FIGS. 16A, 16B and 16C are, respectively, graphs showing various aberrations of the variable magnification optical system according to the Fourth Example upon focusing on a close distance object, in which FIG. 16A is in the wide-angle end state, FIG. 16B is in the intermediate focal length state, and FIG. 16C is in the telephoto end state.

As is apparent from the respective graphs, the variable magnification optical system according to the present Example has superb optical performance as a result of good corrections to various aberrations from the wide-angle end state to the telephoto end state, and further excellent optical performance even upon carrying out vibration reduction as well as upon focusing on a close distance object.

With such construction according to each Example described above, it is possible to realize a variable magnification optical system whose focusing lens group is compact in size and reduced in weight, so high speed and quiet focusing can be effected without lens barrel being made large in size, and further by which variations in aberrations upon varying magnification from the wide angle end state to the telephoto end state as well as variations in aberrations upon focusing from the infinite distance object to the close distance object can be superbly suppressed.

Meanwhile, each of the above described Example is a concrete example of the invention of the present application, and the invention of the present application is not limited to them. The contents described below can be adopted without deteriorating an optical performance of the variable magnification optical systems of the present application.

Although the variable magnification optical systems each having four group or five group configuration were illustrated above as numerical examples of the variable magnification optical systems of the present embodiment, the present application is not limited to them and the variable magnification optical systems having other configurations (such as six group configuration and the like) can be configured. Concretely, a lens configuration that a lens or a lens group is added to the most object side of the variable magnification optical system of each Example is possible, and a lens configuration that a lens or a lens group is added to the most image side of the variable magnification optical system of the present application is also possible.

Further, in the variable magnification optical system according to each Example, the fourth lens group in the entirety thereof is made as a focusing lens group, but a portion of any lens group or a plurality of lens groups may be made as a focusing lens group. It is preferable that the focusing lens group has positive refractive power. It is more preferable that the focusing lens group consists of two lenses. The focusing lens group can be used for auto focus, and suitable for being driven by a motor for auto focus such as an ultrasonic motor, stepping motor, VCM motor or the like, and it is possible to realize high speed auto focus and quiet auto focus superbly.

Further, in the variable magnification optical system according to each Example described above, a portion of the third lens group is made as a vibration reduction lens group, but any lens group in the entirety thereof or in a portion thereof can be so moved, as a vibration reduction lens group, to have a component in a direction perpendicular to the optical axis, or rotationally moved (swayed) in an intra-plane direction including the optical axis for conducting vibration reduction. Further, in the variable magnification optical system according to each Example described above, it is not always necessary to have any configuration for conducting vibration reduction.

Further, in the variable magnification optical system according to each Example described above, it is preferable to arrange an aperture stop in the third lens group, and a lens frame can substitute for the aperture stop without disposing a member as an aperture stop.

Further, in the variable magnification optical system according to each Example described above, a lens surface of a lens may be a spherical surface, a plane surface, or an aspherical surface. Each lens may be formed of glass material, resin material or composite of glass material and resin material. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Moreover, the lens surface(s) of the lenses configuring the variable magnification optical system according to each Example described above, may be coated with anti-reflection coating(s). With this contrivance, it is feasible to reduce a flare as well as ghost and attain a high optical performance with high contrast. In particular, it is preferable that, in the variable magnification optical system according to each Example described above, the second object side lens surface counted from the most object side may be applied with anti-reflection coating.

Next, a camera equipped with the variable magnification optical system according to the present embodiment, will be explained with referring to FIG. 17.

Figure 17:
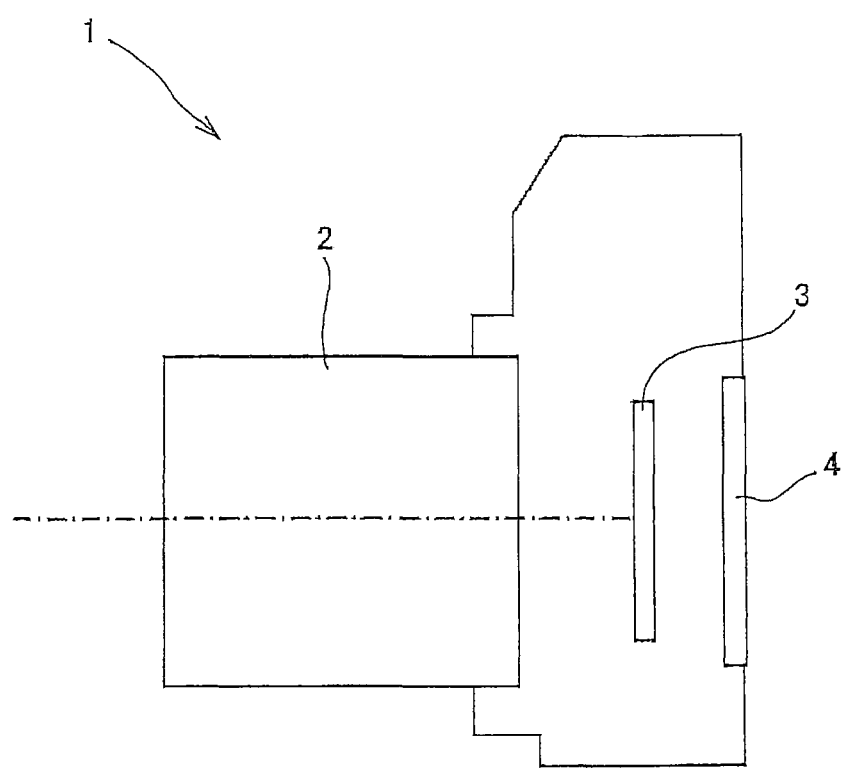
FIG. 17 is a view showing a configuration of a camera equipped with the variable magnification optical system.

FIG. 17 is a view showing a configuration of a camera equipped with the variable magnification optical system according to the present embodiment.

A camera 1 is a lens interchangeable type so-called mirror-less camera equipped with the variable magnification optical system according to the First Example as an imaging lens 2, as shown in FIG. 17.

In the camera 1, light emitted from an unillustrated object (an object to be imaged) is collected by the imaging lens 2, and forms an image of the object to be imaged on an imaging plane of an imaging part 3 through an unillustrated OLPF (optical low pass filter). The image of the object to be imaged is photo-electronically converted through a photo-electronic conversion element provided in the imaging part 3 to form an object image. This object image is displayed on an EVF (electronic view finder) 4 provided on the camera 1. Thus, a photographer can observe the object image through the EVF 4.

When the photographer presses an unillustrated release button, the object image formed through the imaging part 3 is stored in an unillustrated memory. Thus, the photographer can take a picture of the object to be imaged by the camera 1.

The variable magnification optical system according to the First Example described above is mounted on the camera 1 as the imaging lens 2, thereby the focusing lens group being made compact in size and reduced in weight, so that it is possible to realize a variable magnification optical system whose focusing lens group is compact in size and reduced in weight, so high speed and quiet focusing can be effected without lens barrel being made large in size, and further by which variations in aberrations upon varying magnification from the wide angle end state to the telephoto end state as well as variations in aberrations upon focusing from the infinite distance object to the close distance object can be superbly suppressed.

Incidentally, even if the camera is so composed that the variable magnification optical system according to the Second to Fourth Examples is mounted on the camera as the imaging lens 2, the same effect can be attained as the camera 1. Moreover, the same effect as the above camera 1 is attained even in the case where the variable magnification optical system according to each of Examples as described, is mounted on a single lens reflex-type camera which is provided with a quick return mirror and in which an object to be imaged is observed through a finder optical system.

Figure 18:
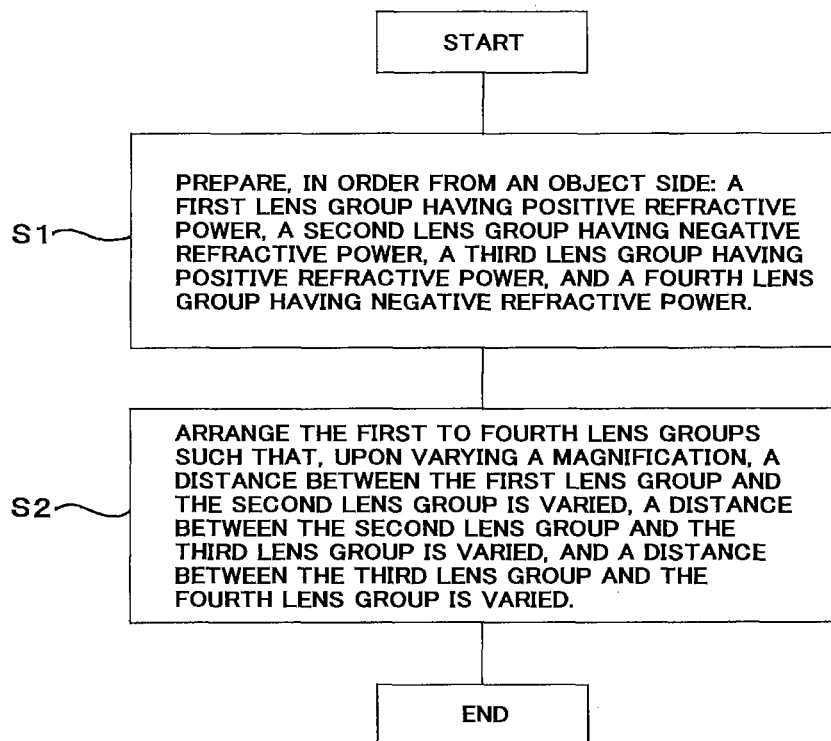
FIG. 18 is a flowchart schematically showing a method for manufacturing the variable magnification optical system.

Finally, an outline of a method for manufacturing a variable magnification optical system according to the present embodiment is described with referring to FIG. 18.

FIG. 18 is a view showing an outline of a method for manufacturing a variable magnification optical system according to the present embodiment.

A method for manufacturing a variable magnification optical system according to the present embodiment, shown in FIG. 18, comprises step S1 of preparing, in order from an object side: a first lens group having positive refractive power, a second lens group having negative refractive power, a third lens group having positive refractive power, and a fourth lens group having negative refractive power; step S2 of arranging the first to fourth lens groups such that, upon varying a magnification, a distance between the first lens group and the second lens group is varied, a distance between the second lens group and the third lens group is varied, and a distance between the third lens group and the fourth lens group is varied; upon focusing from an infinite distance object to a close distance object, the fourth lens group being moved; and the following conditional expressions (1) and (2) being satisfied:

$$0.55 < f2/f4 < 1.40 \quad (1)$$

$$1.40 < f1/fw < 2.80 \quad (2)$$

where f1 denotes a focal length of the first lens group; f2 denotes a focal length of the second lens group; f4 denotes a focal length of the fourth lens group; and fw denotes a focal length of the variable magnification optical system in the wide angle end state.

Thus, according to the method for manufacturing a variable magnification optical system of the present embodiment, it is possible to manufacture a variable magnification optical system whose focusing lens group is compact in size and reduced in weight, thereby high speed and quiet focusing being effected without lens barrel being made large in size, and further by which variations in aberrations upon varying magnification from the wide angle end state to the telephoto end state as well as variations in aberrations upon focusing from the infinite distance object to the close distance object can be superbly suppressed.

EXPLANATION OF SYMBOLS

G1: first lens group
G2: second lens group
G3: third lens group
G4: fourth lens group
G5: fifth lens group
S: aperture stop
I: image plane

What is claimed is:

1. A variable magnification optical system comprising, in order from an object side, a first lens group having positive refractive power, a second lens group having negative refractive power, a third lens group having positive refractive power, and a fourth lens group having negative refractive power;
  upon varying a magnification, a distance between the first lens group and the second lens group being varied, a distance between the second lens group and the third lens group being varied, and a distance between the third lens group and the fourth lens group being varied;
  upon focusing, the fourth lens group being moved; and
  the following conditional expressions being satisfied:

$$0.55 < f2/f4 < 1.40$$

$$1.40 < f1/fw \le 2.094$$

where f1 denotes a focal length of the first lens group, f2 denotes a focal length of the second lens group, f4 denotes a focal length of the fourth lens group, and fw denotes a focal length of the variable magnification optical system in the wide angle end state.

2. The variable magnification optical system according to claim 1, wherein the following conditional expression is satisfied:

$$0.82 < (-f2)/f3 < 1.30$$

where f3 denotes a focal length of the third lens group.

3. The variable magnification optical system according to claim 1, wherein the following conditional expression is satisfied:

$$2.00 < f1/(-f2) < 4.00.$$

4. The variable magnification optical system according to claim 1, wherein the fourth lens group consists of, in order from the object side, a positive lens and a negative lens.

5. The variable magnification optical system according to claim 4, wherein the following conditional expression is satisfied:

$$2.20 < fP/(-fN) < 3.70$$

where fP denotes a focal length of the positive lens in the fourth lens group, and fN denotes a focal length of the negative lens in the fourth lens group.

6. The variable magnification optical system according to claim 1, wherein, upon varying a magnification, the first lens group is fixed in position, with respect to the image plane.

7. The variable magnification optical system according to claim 1, wherein, upon varying a magnification, the third lens group is fixed in position, with respect to the image plane.

8. The variable magnification optical system according to claim 1, wherein the first lens group comprises, in order from the object side, a positive lens, a negative lens and a positive lens.

9. The variable magnification optical system according to claim 1, comprises a vibration reduction lens group that is movable to have a displacement component in a direction perpendicular to the optical axis.

10. The variable magnification optical system according to claim 9, wherein the following conditional expression is satisfied:

$$0.70 < |fvr|/f3 < 1.60$$

where fvr denotes a focal length of the vibration reduction lens group.

11. An optical equipment comprising a variable magnification optical system according to claim 1.

12. An imaging equipment equipped with a variable magnification optical system according to claim 1, and an imaging portion picking up an image formed by the variable magnification optical system.

13. A method for manufacturing a variable magnification optical system, comprising the steps of arranging, in order from an object side, a first lens group having positive refractive power, a second lens group having negative refractive power, a third lens group having positive refractive power, and a fourth lens group having negative refractive power such that, upon varying a magnification, a distance between the first lens group and the second lens group is varied, a distance between the second lens group and the third lens group is varied, and a distance between the third lens group and the fourth lens group is varied; and
  upon focusing, the fourth lens group being moved;
  the method further comprising one of the following features A and B:
  the feature A comprising:
  satisfying the following conditional expressions:

$$0.55 < f2/f4 < 1.40$$

$$1.40 < f1/fw \le 2.094$$

where f1 denotes a focal length of the first lens group, f2 denotes a focal length of the second lens group, f4 denotes a focal length of the fourth lens group, and fw denotes a focal length of the variable magnification optical system in the wide angle end state, and
  the feature B comprising:
  arranging the third lens group to be fixed in position with respect to the image plane upon varying a magnification; and satisfying the following conditional expressions:

$$1.40 < f1/fw < 2.80$$

$$2.00 < f1/(-f2) < 3.50$$

where f1 denotes focal length of the first lens group, f2 denotes a focal length of the second lens group, and fw denotes a focal length of the variable magnification optical system in the wide angle end state.

14. A variable magnification optical system comprising, in order from an object side, a first lens group having positive refractive power, a second lens group having negative refractive power, a third lens group having positive refractive power, and a fourth lens group having negative refractive power;

upon varying a magnification, a distance between the first lens group and the second lens group being varied, a distance between the second lens group and the third lens group being varied, and a distance between the third lens group and the fourth lens group being varied;

upon focusing, the fourth lens group being moved;

upon varying a magnification, the third lens group being fixed in position, with respect to the image plane; and the following conditional expressions being satisfied:

$$1.40 < f1/fw < 2.80$$

$$2.00 < f1/(-f2) < 3.50$$

where f1 denotes a focal length of the first lens group, f2 denotes a focal length of the second lens group, and fw denotes a focal length of the variable magnification optical system in the wide angle end state.

15. The variable magnification optical system according to claim 14, wherein the first lens group comprises, in order from the object side, a positive lens, a negative lens and a positive lens.

16. The variable magnification optical system according to claim 14, comprises a vibration reduction lens group that is movable to have a displacement component in a direction perpendicular to the optical axis.

17. The variable magnification optical system according to claim 16, wherein the following conditional expression is satisfied:

$$0.70 < |fvr|/f3 < 1.60$$

where fvr denotes a focal length of the vibration reduction lens group.

18. An optical equipment comprising a variable magnification optical system according to claim 14.

* * * * *